US011723036B2

(12) United States Patent
Teherzadeh Boroujeni et al.

(10) Patent No.: US 11,723,036 B2
(45) Date of Patent: Aug. 8, 2023

(54) DYNAMIC SEARCH SPACES

(71) Applicant: QUALCOMM Incorporated, San Diego, CA (US)

(72) Inventors: Mahmoud Teherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 17/087,416

(22) Filed: Nov. 2, 2020

(65) Prior Publication Data
US 2021/0160828 A1 May 27, 2021

Related U.S. Application Data

(60) Provisional application No. 62/939,519, filed on Nov. 22, 2019.

(51) Int. Cl.
*H04W 64/00* (2009.01)
*H04W 72/23* (2023.01)
(Continued)

(52) U.S. Cl.
CPC ......... *H04W 72/23* (2023.01); *H04W 64/003* (2013.01); *H04W 72/0446* (2013.01); *H04W 72/0453* (2013.01)

(58) Field of Classification Search
CPC ............. H04W 72/042; H04W 64/003; H04W 72/0446; H04W 72/0453; H04W 72/23;
(Continued)

(56) References Cited

U.S. PATENT DOCUMENTS

2005/0221752 A1* 10/2005 Jamieson .............. H04W 40/00
455/1
2017/0055104 A1* 2/2017 Wegelin .............. H04W 72/082
(Continued)

FOREIGN PATENT DOCUMENTS

WO WO-2019139955 A1 7/2019

OTHER PUBLICATIONS

Intel Corporation: "PDCCH Search Spaces and Monitoring," 3GPP Draft; R1-1712569 Search Space Design, 3rd Generation Partnership Project (3GPP), Mobile Competence Centre; 650, Route Des Lucioles; F-06921, Sophia-Antipolis Cedex; France, vol. RAN WG1, No. Prague, P.R. Czechia; Aug. 21, 2017-Aug. 25, 2017 Aug. 20, 2017, XP051315385, 11 pages, Retrieved from the Internet: URL: http://www.3gpp.org/ftp/Meetings_3GPP_SYNC/RAN1/Docs/ [retrieved on Aug. 20, 2017].
(Continued)

*Primary Examiner* — Dady Chery
(74) *Attorney, Agent, or Firm* — Holland & Hart LLP

(57) ABSTRACT

Methods, systems, and devices for wireless communications are described. A communication device, which may be otherwise known as user equipment (UE) may receive, on a downlink channel, a configuration defining a search space for a downlink control channel. The UE may receive, on the downlink channel, a message including an indication of occupied control resources within the search space. Based on the indication, the UE may monitor a modified version of the search space for a downlink control information (DCI) block. The UE may receive, on the downlink control channel, the DCI block based on the monitoring.

28 Claims, 16 Drawing Sheets

(51) Int. Cl.
*H04W 72/0446* (2023.01)
*H04W 72/0453* (2023.01)

(58) Field of Classification Search
CPC ... H04L 5/0096; H04L 5/0053; H04L 5/0094; H04L 5/005
See application file for complete search history.

(56) References Cited

U.S. PATENT DOCUMENTS

2017/0264417 A1\* 9/2017 Eriksson ............. H04W 72/042
2019/0110276 A1\* 4/2019 Yang .................. H04W 72/042

OTHER PUBLICATIONS

International Search Report and Written Opinion—PCT/US2020/058716—ISA/EPO—dated Feb. 15, 2021.

\* cited by examiner

DYNAMIC SEARCH SPACES

CROSS REFERENCE

The present Application for Patent claims the benefit of U.S. Provisional Patent Application No. 62/939,519 by TAHERZADEH BOROUJENI et al., entitled "DYNAMIC SEARCH SPACES," filed Nov. 22, 2019, assigned to the assignee hereof, and expressly incorporated by reference herein.

FIELD OF TECHNOLOGY

The following relates generally to wireless communications and more specifically to dynamic search spaces.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Various aspects of the described techniques relate to configuring a communication device, which may be a user equipment (UE), to support dynamic search spaces in wireless communications systems. For example, the communication device may be semi-statically configured with a search space for a downlink control channel (e.g., a physical downlink control channel (PDCCH)), but that search space may be dynamically modified when downlink data resources (e.g., physical downlink shared channel (PDSCH) resources) are preempted or cancelled. In some examples, the preempted or cancelled downlink data resources may be tied to or otherwise associated with control resources in the configured search space, and the described techniques may facilitate configuring the communication device to modify the configured search space to remove or otherwise account for control resources in the configured search space that are linked with preempted or cancelled data resources.

In some examples, the communication device may be configured to receive a message, that implicitly indicates a set occupied control resources within the configured search space, such as through the use of a preemption indication or cancellation indication pointing to a set of occupied data resources that is linked to the set of occupied control resources. The communication device may be configured to implicitly infer the occupied control resources from the preemption or cancellation indication, based on a pre-configured relationship (e.g., a radio resource control (RRC) configuration) between the occupied data resources and the occupied control resources. Alternatively, the message may include an explicit indication of the occupied control resources.

The communication device may be configured to monitor a modified version of the configured search space for a downlink control information (DCI) block based on the indication and configuration of the search space. The modified version of the configured search space may omit the occupied control resources, thereby making other blind decoding candidates within the search space available. For example, the communication device may be configured to receive the DCI block by performing blind decoding, according to the modified version of the search space, on control channel candidates associated with control resources in the modified version of the search space. As such, the communication device may be configured to support dynamic search spaces, for example, in fifth generation (5G) systems, which may be referred to as New Radio (NR) systems. The described techniques may include features for improvements to power consumption and, in some examples, may promote enhanced efficiency for high reliability and low latency operations in 5G systems, among other benefits.

A method of wireless communication at a UE is described. The method may include receiving, on a downlink channel, a configuration defining a search space for a downlink control channel, receiving, on the downlink channel, a message including an indication of occupied control resources within the search space, monitoring a modified version of the search space for a DCI block based on the configuration and the indication, and receiving, on the downlink control channel, the DCI block based on the monitoring.

An apparatus for wireless communication is described. The apparatus may include a processor, memory coupled with the processor, and instructions stored in the memory. The instructions may be executable by the processor to cause the apparatus to receive, on a downlink channel, a configuration defining a search space for a downlink control channel, receive, on the downlink channel, a message including an indication of occupied control resources within the search space, monitor a modified version of the search space for a DCI block based on the configuration and the indication, and receive, on the downlink control channel, the DCI block based on the monitoring.

Another apparatus for wireless communication is described. The apparatus may include means for receiving, on a downlink channel, a configuration defining a search space for a downlink control channel, receiving, on the downlink channel, a message including an indication of occupied control resources within the search space, monitoring a modified version of the search space for a second DCI block based on the configuration and the indication, and receiving, on the downlink control channel, the DCI block based on the monitoring.

A non-transitory computer-readable medium storing code for wireless communication is described. The code may include instructions executable by a processor to receive, on a downlink channel, a configuration defining a search space for a downlink control channel, receive, on the downlink channel, a message including an indication of occupied control resources within the search space, monitor a modified version of the search space for a DCI block based on the configuration and the indication, and receive, on the downlink control channel, the DCI block based on the monitoring.

In some examples of the method, apparatuses, and non-transitory computer-readable medium described herein, the indication may include one or more of a preemption indication or a cancellation indication associated with a set of occupied data resources.

Some examples of the method, apparatuses, and non-transitory computer-readable medium described herein may further include operations, features, means, or instructions for determining the occupied control resources based at least in part on the set of occupied data resources.

Some examples of the method, apparatuses, and non-transitory computer-readable medium described herein may further include operations, features, means, or instructions for determining a frequency subband of the set of occupied data resources, wherein determining the occupied control resources is based at least in part on an association between the occupied control resources and the determined frequency subband.

Some examples of the method, apparatuses, and non-transitory computer-readable medium described herein may further include operations, features, means, or instructions for determining the modified version of the search space based at least in part on the configuration.

In some examples of the method, apparatuses, and non-transitory computer-readable medium described herein, the configuration indicates one or more selection parameters for the UE to determine one or more blind decoding candidates for the modified version of the search space.

Some examples of the method, apparatuses, and non-transitory computer-readable medium described herein may further include operations, features, means, or instructions for determining the modified version of the search space by dropping the occupied control resources from the search space.

Some examples of the method, apparatuses, and non-transitory computer-readable medium described herein may further include operations, features, means, or instructions for adding one or more blind decoding candidates to the modified version of the search space based at least in part on the dropping.

Some examples of the method, apparatuses, and non-transitory computer-readable medium described herein may further include operations, features, means, or instructions for monitoring one or more unoccupied control resources in the modified version of the search space based at least in part on the adding.

In some examples of the method, apparatuses, and non-transitory computer-readable medium described herein, determining the modified version of the search space may include operations, features, means, or instructions for mapping the occupied control resources within the search space to one or more control resource sets within the search space, wherein dropping the occupied control resources from the search is based at least in part on the mapping.

In some examples of the method, apparatuses, and non-transitory computer-readable medium described herein, determining the modified version of the search space may include operations, features, means, or instructions for mapping the occupied control resources within the search space to one or more control resource sets within the search space based at least in part on a table, wherein dropping the occupied control resources from the search is based at least in part on the mapping.

Some examples of the method, apparatuses, and non-transitory computer-readable medium described herein may further include operations, features, means, or instructions for identifying a bit field in the message, wherein the bit field includes the indication of occupied control resources within the search space.

Some examples of the method, apparatuses, and non-transitory computer-readable medium described herein may further include operations, features, means, or instructions for receiving, on the downlink channel, an RRC configuration message defining an association between preempted resources of a downlink data channel and the occupied control resources within the search space.

In some examples of the method, apparatuses, and non-transitory computer-readable medium described herein, the downlink control channel includes a PDCCH.

In some examples of the method, apparatuses, and non-transitory computer-readable medium described herein, the configuration includes a semi-static configuration.

A method of wireless communication at a base station is described. The method may include transmitting, on a downlink channel, a configuration defining a search space for a downlink control channel, transmitting, on the downlink channel, a message including an indication of occupied control resources within the search space, modifying a version of the search space for a DCI block based at least in part on the occupied control resources within the search space, and transmitting, on the downlink control channel, the DCI block based at least in part on the modified version of the search space.

An apparatus for wireless communication is described. The apparatus may include a processor, memory coupled with the processor, and instructions stored in the memory. The instructions may be executable by the processor to cause the apparatus to transmit, on a downlink channel, a configuration defining a search space for a downlink control channel, transmit, on the downlink channel, a message including an indication of occupied control resources within the search space, modify a version of the search space for a DCI block based at least in part on the occupied control resources within the search space, and transmit, on the downlink control channel, the DCI block based at least in part on the modified version of the search space.

Another apparatus for wireless communication is described. The apparatus may include means for transmitting, on a downlink channel, a configuration defining a search space for a downlink control channel, transmitting, on the downlink channel, a message including an indication of occupied control resources within the search space, modifying a version of the search space for a DCI block based at least in part on the occupied control resources within the search space, and transmitting, on the downlink control channel, the DCI block based at least in part on the modified version of the search space.

A non-transitory computer-readable medium storing code for wireless communication at a base station is described. The code may include instructions executable by a processor to transmit, on a downlink channel, a configuration defining a search space for a downlink control channel, transmit, on the downlink channel, a message including an indication of occupied control resources within the search space, modify a version of the search space for a DCI block based at least in part on the occupied control resources within the search space, and transmit, on the downlink control channel, the DCI block based at least in part on the modified version of the search space.

In some examples of the method, apparatuses, and non-transitory computer-readable medium described herein, the indication may include a preemption indication or a cancellation indication associated with a set of occupied data resources.

In some examples of the method, apparatuses, and non-transitory computer-readable medium described herein, modifying the version of the search space may include operations, features, means, or instructions for mapping the occupied control resources within the search space to one or more control resource sets within the search space based at least in part on a table.

Some examples of the method, apparatuses, and non-transitory computer-readable medium described herein may further include operations, features, means, or instructions for modifying the version of the search space based at least in part on the configuration.

In some examples of the method, apparatuses, and non-transitory computer-readable medium described herein, the configuration indicates one or more selection parameters for modifying the version of the search space.

In some examples of the method, apparatuses, and non-transitory computer-readable medium described herein, modifying the version of the search space may include operations, features, means, or instructions for mapping the occupied control resources within the search space to one or more control resource sets within the search space.

Some examples of the method, apparatuses, and non-transitory computer-readable medium described herein may further include operations, features, means, or instructions for including the indication in a bit filed in the DCI block, where the bit field includes the indication of occupied control resources within the search space.

Some examples of the method, apparatuses, and non-transitory computer-readable medium described herein may further include operations, features, means, or instructions for transmitting, on the downlink channel, an RRC configuration message defining an association between preempted resources of a downlink data channel and the occupied control resources within the search space.

In some examples of the method, apparatuses, and non-transitory computer-readable medium described herein, the downlink control channel includes a PDCCH.

In some examples of the method, apparatuses, and non-transitory computer-readable medium described herein, the configuration includes a semi-static configuration.

DETAILED DESCRIPTION

Figure 1:
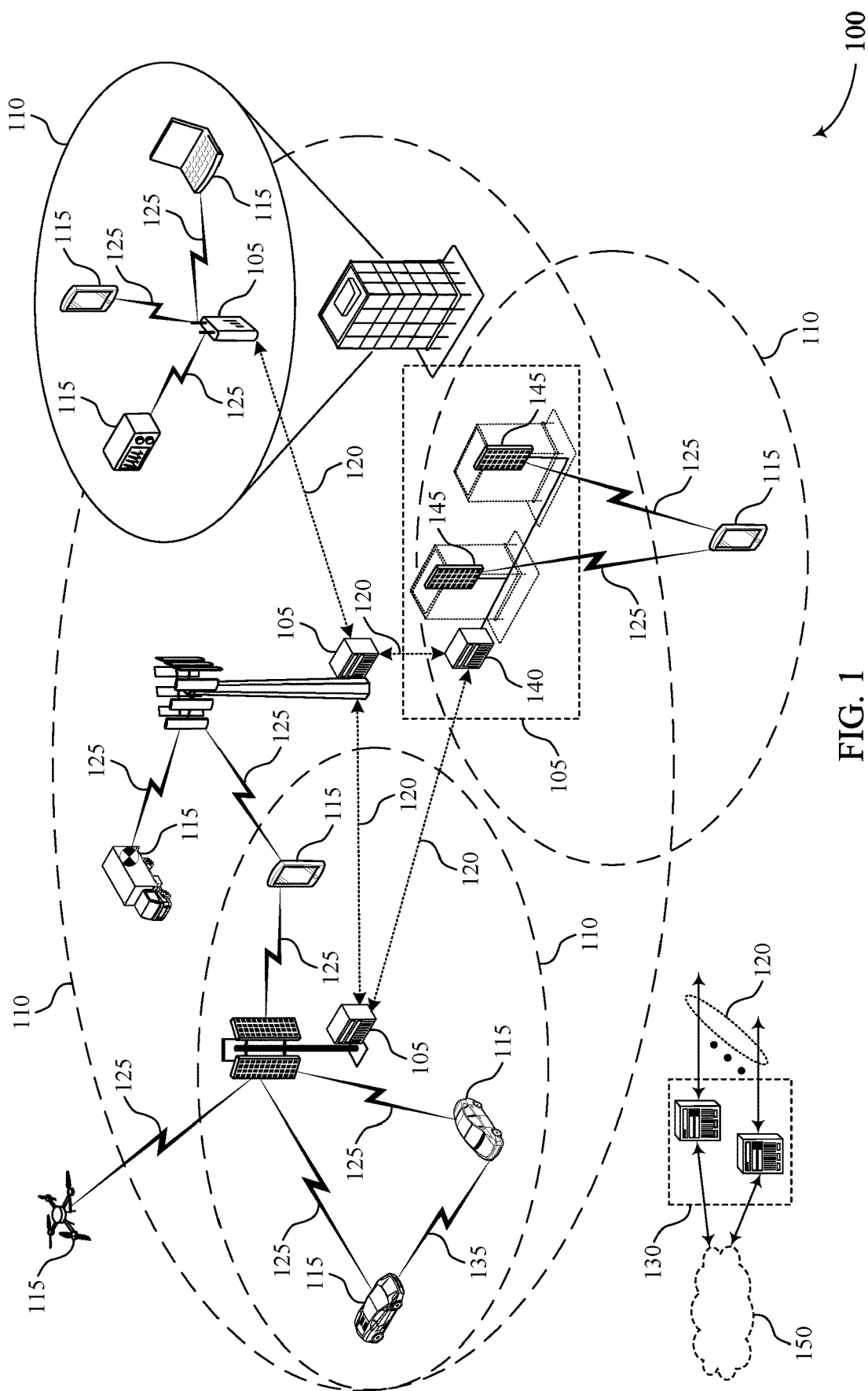
FIGS. 1 and 2 illustrate examples of wireless communications systems that support dynamic search spaces in accordance with aspects of the present disclosure.

Wireless communications systems may include multiple communication devices such as user equipment (UEs) and base stations, which may provide wireless communication services to the UEs. For example, such base stations may be next-generation NodeBs or giga-NodeBs (either of which may be referred to as a gNB) that may support multiple radio access technologies (RATs) including fourth generation (4G) systems, such as Long Term Evolution (LTE) systems, as well as fifth generation (5G) systems, which may be referred to as New Radio (NR) systems. Some UEs may support search space operations related to a search space. A search space may include a common search space configured for multiple UEs and a specific search space configured for a specific UE. In some examples, UEs may monitor one or more control regions of a search space to receive control information or data, or both on a physical channel (e.g., a physical downlink control channel (PDCCH), a physical downlink shared channel (PDSCH)).

A control region (for example, a control resource set) for a physical channel may be defined by a number of symbol durations and may extend across a system bandwidth or a subset of the system bandwidth. One or more control regions (for example, control resource sets) may be configured for multiple UEs. For example, UEs may monitor or search control regions for control information according to one or more search space sets, and each search space set may include one or multiple control channel candidates (e.g., PDCCH candidates) in one or more aggregation levels. An aggregation level for a control channel candidate may refer to a number of control channel resources (for example, control channel elements) associated with encoded information for a control information format having a given payload size.

In some cases, such as in 5G systems, one or more parameters of a search space may be set in a configuration message. The configuration message may be a semi-static configuration message, and the one or more parameters may relate to a total number of blind decodes associated with the search space or a total number of control channel elements associated with the search space, or both. UEs may be configured with the one or more parameters according to the semi-static configuration message. In other words, in 5G systems, all the parameters of a search space may be set by a semi-static configuration through RRC signaling. There are specified limits on the total number of PDCCH candidates monitored by the UEs within that search space. In some other cases, in 5G systems, the search space may correspond to a single control resource set, and the association between the search space and the control resource set may be set in a same or different configuration message. For example, the configuration message may be a search space configuration message and the association may be a field (e.g. a control resource set identifier field) in the search space configuration message. UEs may be configured with the association between the search space and the control resource set based on the search space configuration message.

As demand for communication efficiency increases, some wireless communications systems, such as 4G and 5G systems, may support dynamic search space operations. For example, UEs may be configured to support a dynamic change in a set of control channel candidates (e.g., a set of PDCCH candidates) that the UEs monitor in a search space. It may be useful for some wireless communications systems to support a more dynamic change to a search space for the UEs. For example, if a PDSCH transmission to a UE is preempted by a higher-priority transmission, a portion of the UE's search space may be linked with the preempted transmission. Because some of the limited number of PDCCH candidates may fall within that portion of the search space, those PDCCH candidates may not be useful to the UE, and therefore decrease the efficiency of blind decoding. As such, the UEs may be configured to support a dynamic change in one or more parameters of the set of control channel candidates.

By supporting dynamic search space operations, some wireless communications systems, such as 5G systems may experience control channel (e.g., PDCCH) scheduling flexibility. In addition, the UEs in 5G systems may experience power saving advantages, as a result of supporting the dynamic search space operations. For example, the UEs may experience power saving by reducing a number of blind decodes associated with a search space. Some wireless communications systems, such as 5G systems may also support higher reliability and lower latency communications. For example, when the UEs correspond to different classes of UEs (e.g., different classes of UEs (e.g., enhanced mobile broadband (eMBB) and ultra-reliably low latency communications (URLLC)) with overlapping resources.

To support the above operations, some wireless communications systems, such as 4G and 5G systems may reuse a downlink control information (DCI) to support dynamic search space operations to avoid extra usage of control resources for a new dynamic indication (which may add to a scheduling blockage). Alternatively, some wireless communications systems, such as 4G and 5G systems may use a single small or less frequent DCI for the dynamic indication of dynamic search space operations (e.g., PDDCH monitoring changes for multiple UEs). For example, the described techniques may be used to configure UEs to receive a semi-static configuration defining a search space for a downlink control channel (e.g., a PDCCH). In some examples, the described techniques may facilitate configuring the UEs to support a dynamic search space when control resources for the downlink control channel are occupied by data resources for a downlink data channel.

The UEs may be configured to receive a message that includes an indication of occupied control resources within the search space. In some cases, the message may include a DCI block, where the DCI block includes the indication of occupied control resources within the search space. The UEs may be configured to monitor a modified version of the search space for a subsequent DCI block based on the indication. For example, the UEs may be configured to receive, the subsequent DCI block by decoding control resources according to the modified version of the search space. As such, the UEs may be configured to support dynamic search spaces, for example, in 5G systems.

Particular aspects of the subject matter described in this disclosure may be implemented to realize one or more of the following potential advantages, among others. The techniques employed by UEs may provide benefits and enhancements to the operation of the UEs. For example, operations performed by the UEs may provide improvements to search space operations. In some examples, configuring the UEs to support a dynamic search space when control resources for a downlink control channel are occupied by data resources for a downlink data channel may support improvements to power consumption, spectral efficiency, higher data rates and, in some examples, may promote enhanced efficiency for search space operations, among other benefits. For example, when a preemption indication or a cancellation indication is sent to the UEs in a message to preempt PDSCH resources, the UEs may identify a portion of its configured PDCCH search space that is linked to the preempted PDSCH resources, and dynamically remove that portion of the PDCCH search space. This dynamic update to the PDCCH search space may reconfigure the blind decoding candidates such that all blind decoding candidates in the PDCCH search space are associated with PDSCH resources that are actually available to the UEs. The UEs may then monitor the modified version of the search space for DCI blocks that contain grants for PDSCH transmissions. By supporting dynamic search space operations, the UEs may reduce the number of blind decodes associated with its PDCCH search space while simultaneously supporting higher reliability and lower latency communications, resulting in enhanced power efficiency and network throughput.

Aspects of the disclosure are initially described in the context of wireless communications systems. Aspects of the disclosure are further illustrated by and described with reference to a process flow that relates to dynamic search spaces. Aspects of the disclosure are further illustrated by and described with reference to apparatus diagrams, system diagrams, and flowcharts that relate to dynamic search spaces.

FIG. 1 illustrates an example of a wireless communications system 100 that supports dynamic search spaces in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

The UEs 115 may support dynamic search spaces in the wireless communications system 100. For example, the UEs 115 may be semi-statically configured with a search space for a downlink control channel (e.g., a PDCCH), but that search space may be dynamically modified when downlink data resources (e.g., PDSCH resources) are preempted or cancelled. In some examples, the preempted or cancelled downlink data resources may be tied to or otherwise associated with control resources in the configured search space, and the UEs 115 may modify the configured search space to remove or otherwise account for control resources in the configured search space that are linked with preempted or cancelled data resources. In some examples, the UEs 115 may be configured to receive a DCI block, that implicitly indicates a set occupied control resources within the configured search space, such as through the use of a preemption indication or cancellation indication pointing to a set of occupied data resources that is linked to the set of occupied control resources. The UEs 115 may be configured to implicitly infer the occupied control resources from the preemption or cancellation indication, based on a pre-configured relationship (e.g., an RRC configuration) between the occupied data resources and the occupied control resources. Alternatively, the DCI block may include an explicit indication of the occupied control resources.

The UEs 115 may be configured to monitor a modified version of the configured search space for a subsequent DCI block based on the indication. The modified version of the configured search space may omit the occupied control resources, thereby making other blind decoding candidates within the search space available. For example, the UEs 115 may be configured to receive the subsequent DCI block by performing blind decoding, according to the modified version of the search space, on control channel candidates associated with control resources in the modified version of the search space. As such, the UEs 115 may be configured to support dynamic search spaces, for example, in the wireless communications system 100, which may be a fifth generation (5G) system.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB- IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

A UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105. The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
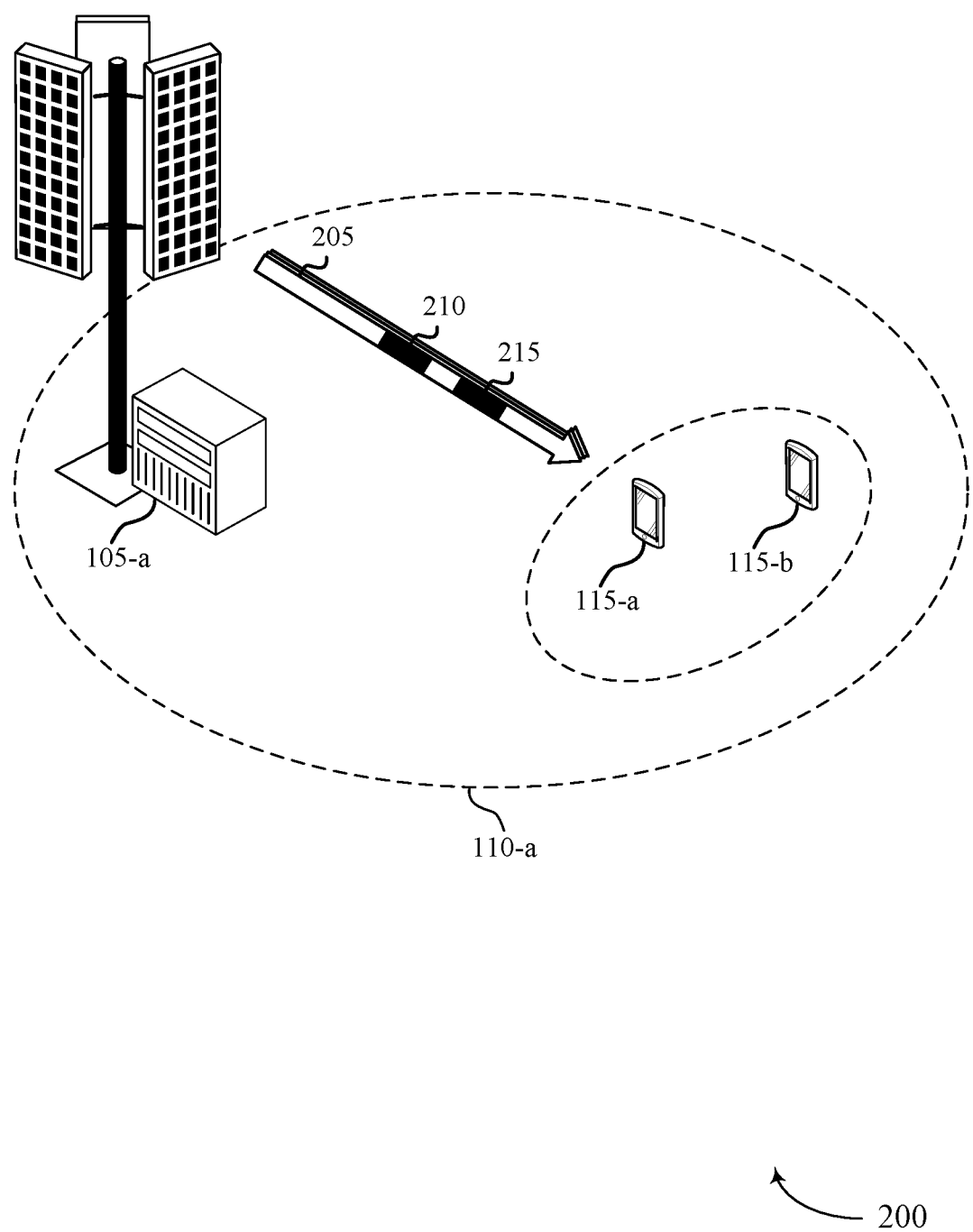

FIG. 2 illustrates an example of a wireless communications system 200 that supports dynamic search spaces in accordance with aspects of the present disclosure. In some examples, the wireless communications system 200 may implement aspects of the wireless communications system 100. For example, the wireless communications system 200 may include a base station 105-a and one or more UEs 115, for example a UE 115-a and a UE 115-b, within a geographic coverage area 110-a. The base station 105-a, the UE 115-a, and the UE 115-b may be examples of the corresponding devices described with reference to FIG. 1. In some examples, the wireless communications system 200 may support multiple RATs including 4G systems such as LTE systems, LTE-A systems, or LTE-A Pro systems, and 5G systems which may be referred to as NR systems. The wireless communications system 200 may support improvements to power consumption, spectral efficiency, higher data rates and, in some examples, may promote enhanced efficiency for high reliability and low latency search space operations, among other benefits.

The wireless communications system 200 may be configured to support ultra-reliable communications or low-latency communications, or various combinations thereof. For example, one or more of the UE 115-a and the UE 115-b in the wireless communications system 200 may support ultra-reliable communications or low-latency communications, or various combinations thereof. In some examples, one or more of the UE 115-a and the UE 115-b may be an enhanced mobile broadband (eMBB) UE, and as such may support eMBB communications. In some other examples, one or more of the UE 115-a and the UE 115-b may be an ultra-reliable low-latency communications (URLLC) UE, and as such may support URLLC communications or mission critical communications.

The base station 105-*a* may configure one or more of the UE 115-*a* and the UE 115-*b* by transmitting a configuration message via one or more directional beams 205 (for example, downlink directional beams). In some examples, the base station 105-*a* may transmit the configuration message on a downlink channel (e.g., a PDCCH) via the one or more directional beams 205. The configuration message may include a configuration of a search space for ultra-reliable communications or low-latency communications, or various combinations thereof. For example, the configuration may define a search space for a downlink control channel (e.g., PDCCH). In some examples, the configuration may be semi-static configuration. The base station 105-*a* may provide the semi-static configuration to one or more of the UE 115-*a* and the UE 115-*b* via RRC signaling.

A search space may include a common search space configured for multiple UEs (e.g., for the UE 115-*a* and the UE 115-*a*) or a specific search space configured for a specific UE (e.g., for the UE 115-*a* or the UE 115-*b*). One or more of the UE 115-*a* and the UE 115-*b* may monitor one or more control regions of a search space to receive, from the base station 105-*a*, control information or data, or both on a physical channel (e.g., a PDCCH, a PDSCH). A control region (for example, a control resource set) for a physical channel may be defined by a number of symbol durations and may extend across a system bandwidth or a subset of the system bandwidth. One or more control regions (for example, control resource sets) may be configured for multiple UEs. For example, one or more of the UE 115-*a* and the UE 115-*b* may monitor or search control regions for control information according to one or more search space sets, and each search space set may include one or multiple control channel candidates (e.g., also referred to as PDCCH candidates) in one or more aggregation levels. An aggregation level for a control channel candidate may refer to a number of control channel resources (for example, control channel elements).

In some cases, such as in 5G systems, the base station 105-*a* may configure one or more of the UE 115-*a* or the UE 115-*b* with one or multiple control channel candidates (e.g., PDCCH candidates) in a search space. The base station 105-*a* may be configured to assign a lower priority for communications (e.g., eMBB communications) to the UE 115-*a*, and a higher priority for communications (e.g., URLLC communications) to the UE 115-*b*. One or more of the UE 115-*a* or the UE 115-*b* may, in some examples, experience a decrease in efficiency of blind decoding of the one or multiple control channel candidates (e.g., PDCCH candidates) in the search space. That is, some of the one or multiple control channel candidates (e.g., PDCCH candidates) in the search space may not be useful to one or more of the UE 115-*a* or the UE 115-*b* due to communication operations by the base station 105-*a*, and therefore decrease the efficiency of blind decoding by one or more of the UE 115-*a* or the UE 115-*b*. For example, if a lower priority transmission to the UE 115-*a* is preempted by a higher priority transmission to the UE 115-*b*, a portion of a search space configured for the UE 115-*a* may be linked with the preempted transmission. One or more of a lower priority transmission and a higher priority transmission may be data or control information associated with various information channels (for example, control channels, data channels). Control channels may include a PDCCH, a physical control channel may include physical uplink control channel (PUCCH), among other examples. Data channels may include a physical downlink shared channel (PDSCH), a physical uplink shared channel (PUSCH), among other examples.

The base station 105-*a* may be configured to transmit a preemption indication or a cancellation indication to one or more of the UE 115-*a* and the UE 115-*b*. In some cases, such as in 5G systems, the base station 105-*a* may be configured to may transmit a preemption indication of occupied downlink data resources. In some other cases, such as in 5G systems, the base station 105-*a* may be configured to transmit a cancellation indication of occupied uplink data resources. In the wireless communications system 200, the base station 105-*a* may be configured to configure one or more of the UE 115-*a* and the UE 115-*b* to support dynamic search spaces to reduce blind decoding in a search space while simultaneously supporting higher reliability and lower latency communications, resulting in enhanced power efficiency and throughput in the wireless communications system 200.

In some examples, the base station 105-*a* may transmit, on a downlink channel, a message 210 to one or more of the UE 115-*a* and the UE 115-*b* via one or more directional beams 205 (for example, downlink directional beams). In some cases, the message 210 may be transmitted on a downlink control channel, such as a PDCCH, in a DCI block to one or more of the UE 115-*a* and the UE 115-*b* via one or more directional beams 205 (for example, downlink directional beams). The message 210 may include an indication of occupied control resources within a search space. This indication of occupied control resources may be an implicit indication based on a preemption indication or a cancellation indication pointing to occupied data resources that are linked to the occupied control resources within the search space. One or more of the UE 115-*a* and the UE 115-*b* may be configured to implicitly infer information about the occupied control resources from the indication, based on a pre-configured relationship (e.g., via RRC configuration). For example, if a lower priority transmission to the UE 115-*a* is preempted by a higher priority transmission to the UE 115-*b*, a portion of a search space configured for the UE 115-*a* may be linked with the preempted transmission. As such, the base station 105-*a* may transmit, to the UE 115-*a*, the message 210, where the message 210 includes an indication of occupied control resources within the search space associated with the UE 115-*a*. In some examples, the base station 105-*a* may transmit the message 210 to the UE 115-*b*. As such, in some examples when transmitted the message 210 in a PDCCH (e.g., DCI block), the PDCCH may be a group common PDCCH.

In some examples, the indication may be one or more of a preemption indication or a cancellation indication associated with a set of occupied data resources of one or more of the UE 115-*a* and the UE 115-*b*. As such, the base station 105-*a* may be configured to use one or more of a preemption indication or a cancellation indication to implicitly or explicitly inform one or more of the UE 115-*a* and the UE 115-*b* of a modified version of a search space configured for one or more of the UE 115-*a* and the UE 115-*b*. Such indication may be useful, for example, for eMBB UEs whose resources are occupied by some URLLC downlink or uplink communications. For example, the base station 105-*a* may transmit, to the UE 115-*a*, the message 210, where the message 210 includes an indication (e.g., a preemption indication or a cancellation indication) of occupied control resources within the search space associated with the UE 115-*a*. In some examples, the UE 115-*a* may receive the indication, and determine occupied control resources within the search space based on the set of occupied data resources. In some other examples, the UE 115-a may receive the indication, and determine a frequency subband of the set of occupied data resources. The UE 115-a may, as result, determine the occupied control resources based on an association between the occupied control resources and the determined frequency subband.

To reduce blind decoding in the search space configured for the UE 115-a while simultaneously supporting higher reliability and lower latency communications, the UE 115-a may drop the occupied control resources from the search space, and add one or more blind decoding candidates to the search space based on dropping the occupied control resources from the search space. In some examples, the UE 115-a may be configured to automatically add the one or more blind decoding candidates to the search space (e.g., activate an additional search space) based on dropping some control channel candidates associated with the occupied control resources. In some examples, the UE 115-a may be configured to map the occupied control resources within the search space to one or more control resource sets within the search space. In some other examples, the UE 115-a may be configured to map the occupied control resources within the search space to one or more control resource sets within the search space based on a table. For example, the UE 115-a may be configured with a table (or a set of tables) that maps a bitfield in the indication (e.g., a preemption indication or a cancellation) to the occupied control resources in the search space. The UE 115-a may identify a bit field in the message 210. The bit field may include the indication of the occupied control resources within the search space. Based on the mapping, the UE 115-a may drop the occupied control resources from the search space.

As such, when an indication (e.g., a preemption indication or a cancellation indication) is transmitted to the UE 115-a to preempt data resources (e.g., PDSCH resources), the UE 115-a may identify a portion of its configured search space that is linked to the preempted data resources, and dynamically remove that portion of the search space. This dynamic update to the search space may reconfigure the blind decoding candidates such that all blind decoding candidates in the search space are associated with data resources that are actually available to the UE 115-a. As such, the UE 115-a may monitor a modified version of the search space for subsequent DCI blocks (e.g. a DCI block 215). For example, the UE 115-a may monitor the one or more unoccupied control resources in the modified version of the search space based on the one or more added blind decoding candidates. The base station 105-a may transmit, and the UE 115-a may receive, the DCI block 215 on a downlink control channel, such as a PDCCH via the one or more directional beams 205 (for example, downlink directional beams. For example, the UE 115-a may receive the DCI block according to the modified version of the search space.

The operations performed by the base station 105-a, the UE 115-a, and the UE 115-b, for example, may provide improvements to dynamic search space operations in the wireless communications system 200. Furthermore, the operations performed by the base station 105-a, the UE 115-a, and the UE 115-b may provide benefits and enhancements to the operation of the UE 115-a and the UE 115-b. For example, by supporting dynamic search space operations, the UE 115-a and the UE 115-b may reduce a number of blind decodes associated with its search space while simultaneously supporting higher reliability and lower latency communications, resulting in enhanced power efficiency and network throughput in the wireless communications system 200.

Figure 3:
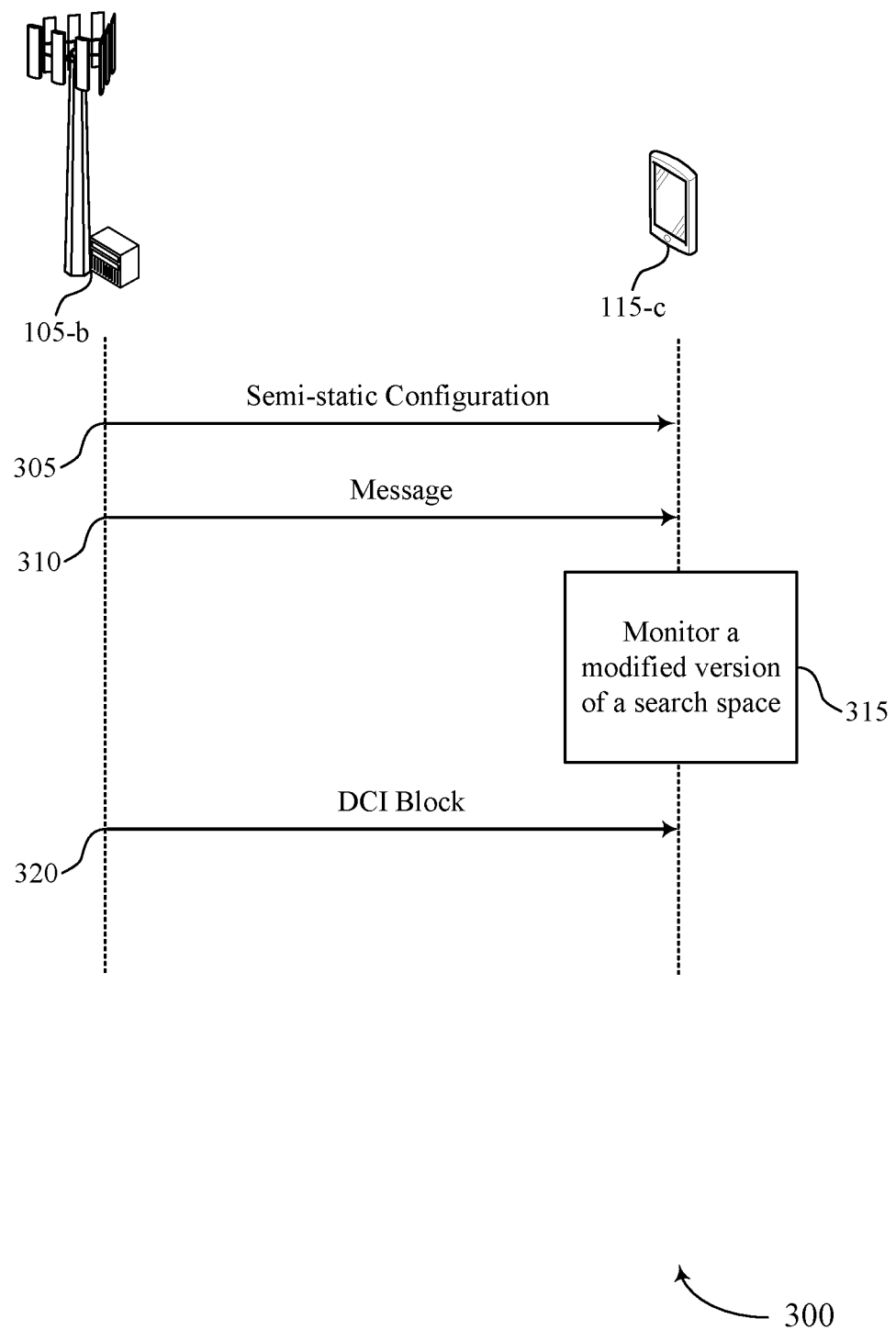
FIG. 3 illustrates an example of a process flow that supports dynamic search spaces in accordance with aspects of the present disclosure.

FIG. 3 illustrates an example of a process flow 300 that supports dynamic search spaces in accordance with aspects of the present disclosure. The process flow 300 may implement aspects of the wireless communications system 100 and 200 described with reference to FIGS. 1 and 2, respectively. For example, the process flow 300 may be based on a configuration by a base station 105-b or a UE 115-c, and implemented by the UE 115-c, for reduced power consumption, decreased blind decoding, improved search space utilization, and may promote low latency for wireless communications, among other benefits. The base station 105-b and the UE 115-c may be examples of a base station 105 and a UE 115, as described with reference to FIGS. 1 and 2. In the following description of the process flow 300, the operations between the base station 105-b and the UE 115-c may be transmitted in a different order than the example order shown, or the operations performed by the base station 105-b and the UE 115-c may be performed in different orders or at different times. Some operations may also be omitted from the process flow 300, and other operations may be added to the process flow 300.

At 305, the base station 105-b may transmit, on a downlink channel, a semi-static configuration to the UE 115-c. The semi-static configuration may define a search space for a downlink control channel, such as a PDCCH for the UE 115-c. The search space may be a common search space configured for multiple UEs includes the UE 115-c, or may be a specific search space configured for the UE 115-c. At 310, the base station 105-b may transmit a message (e.g., DCI block) to the UE 115-c. The message may include an indication of occupied control resources within the search space. In some examples, the indication may be a preemption indication or a cancellation indication associated with a set of occupied data resources. For example, the preemption indication may be associated with a set of occupied downlink data resources, and the cancellation indication may be associated with a set of occupied uplink data resources.

In some examples, the UE 115-c may determine the occupied control resources based exclusively on the indication. Alternatively, the UE 115-c may determine the occupied control resources based implicitly, for example, by inferring about the occupied control resources from the indication, based on some pre-configured relationship (e.g., an RRC configuration). In some examples, the UE 115-c may determine the occupied control resources based on the set of occupied data resources. In some other examples, the UE 115-c may determine the occupied control resources based on an association between the occupied control resources and a frequency subband of the set of occupied data resources. In other examples, the UE 115-c may identify a bit field in the message, where the bit field includes the indication of the occupied control resources within the search space. As such, the UE 115-c may be configured to determine the occupied control resources based exclusively on the indication or implicitly by inferring about the occupied control resources from the indication.

At 315, the UE 115-c may monitor a modified version of a search space. The UE 115-c may determine a modified version of the search space based on the occupied control resources. In some examples, the UE 115-c may drop the occupied control resources from the search space. As such, the modified version of the search space may exclude the dropped occupied control resources. In some examples, the UE 115-c may map the occupied control resources within the search space to one or more control resource sets within the search space, and thereby drop the occupied control resources from the search space based on the mapping. The UE 115-c may, in some examples, map the occupied control resources within the search space to one or more control resource sets within the search space based on a table. For example, the UE 115-c may be configured with a table (or a set of tables) that maps a bitfield in the indication (e.g., a preemption indication or a cancellation) to the occupied control resources in the search space. In some examples, the UE 115-c may add one or more blind decoding candidates to the modified version of the search space based on the dropped occupied control resources. At 320, the base station 105-b may transmit a DCI block to the UE 115-c, and the UE 115-c may receive the DCI block according to the modified version of the search space.

The operations performed by the base station 105-b and the UE 115-c as part of, but not limited to, process flow 300 may provide improvements to UE 115-c blind decoding procedures. Furthermore, the operations performed by the base station 105-b and the UE 115-c as part of, but not limited to, process flow 300 may provide benefits and enhancements to the operation of the UE 115-c. For example, the described dynamic search space operations in the process flow 300 may support reduced power consumption, decreased blind decoding, among other advantages.

Figure 4:
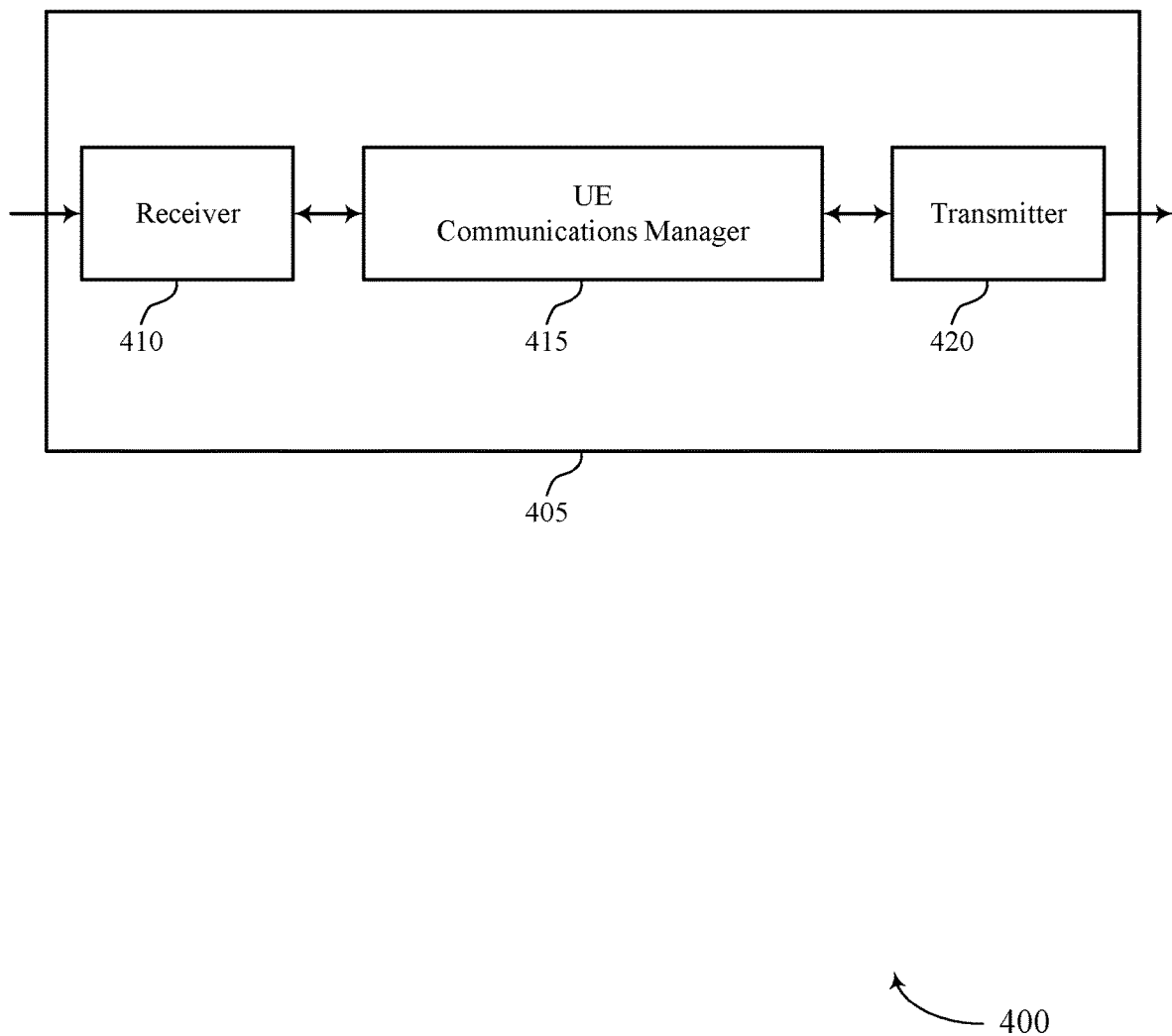
FIGS. 4 and 5 show block diagrams of devices that support dynamic search spaces in accordance with aspects of the present disclosure.

FIG. 4 shows a block diagram 400 of a device 405 that supports dynamic search spaces in accordance with aspects of the present disclosure. The device 405 may be an example of aspects of a UE 115 as described herein. The device 405 may include a receiver 410, a UE communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to dynamic search spaces, etc.). Information may be passed on to other components of the device 405. The receiver 410 may be an example of aspects of the transceiver 720 described with reference to FIG. 7. The receiver 410 may utilize a single antenna or a set of antennas.

The UE communications manager 415 may receive, on a downlink channel, a configuration defining a search space for a downlink control channel, receive, on the downlink control channel, a message including an indication of occupied control resources within the search space. The UE communications manager 415 may monitor a modified version of the search space for a DCI block based on the configuration and the indication, and receive, on the downlink channel, the DCI block based on the monitoring. The UE communications manager 415 may be an example of aspects of the communications manager 710 described herein.

The UE communications manager 415 may as described herein be implemented to realize one or more potential advantages. One implementation may allow the device 405 to save power and increase battery life by communicating with a base station 105 (as shown in FIG. 1) more efficiently. For example, the device 405 may reduce a number of blind decodes associated with a search space when control resources for a downlink control channel are occupied by data resources for a downlink data channel. In addition, the device 405 may experience reduced complexity, better throughput through faster blind decoding. Another implementation may promote higher reliability and lower latency communications at the device 405 due to control channel (e.g., PDCCH) scheduling flexibility of the device 405, as a result of supporting dynamic search spaces.

The UE communications manager 415, or its sub-components, may be implemented in hardware, code (e.g., software or firmware) executed by a processor, or any combination thereof. If implemented in code executed by a processor, the functions of the UE communications manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 415, or its sub-components, may be physically located at various positions, including being distributed such that portions of functions are implemented at different physical locations by one or more physical components. In some examples, the UE communications manager 415, or its sub-components, may be a separate and distinct component in accordance with various aspects of the present disclosure. In some examples, the UE communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
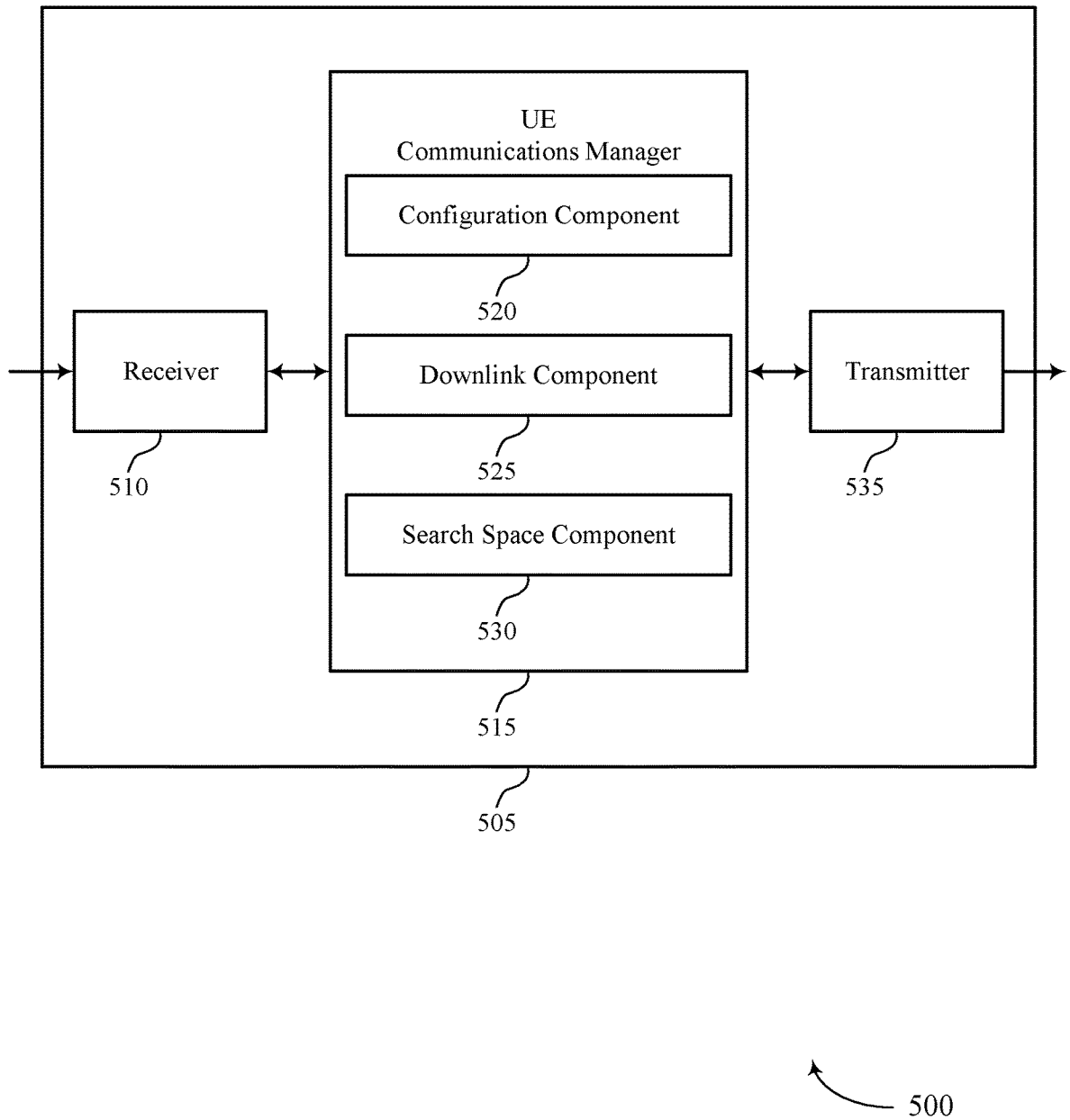

FIG. 5 shows a block diagram 500 of a device 505 that supports dynamic search spaces in accordance with aspects of the present disclosure. The device 505 may be an example of aspects of a device 405, or a UE 115 as described herein. The device 505 may include a receiver 510, a UE communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to dynamic search spaces, etc.). Information may be passed on to other components of the device 505. The receiver 510 may be an example of aspects of the transceiver 720 described with reference to FIG. 7. The receiver 510 may utilize a single antenna or a set of antennas.

The UE communications manager 515 may be an example of aspects of the UE communications manager 415 as described herein. The UE communications manager 515 may include a configuration component 520, a downlink component 525, and a search space component 530. The UE communications manager 515 may be an example of aspects of the communications manager 710 described herein. The configuration component 520 may receive, on a downlink channel, a configuration defining a search space for a downlink control channel. The downlink component 525 may receive, on the downlink channel, a message including an indication of occupied control resources within the search space. The search space component 530 may monitor a modified version of the search space for a DCI block based on the configuration and the indication. The downlink component 525 may receive, on the downlink control channel, the DCI block based on the monitoring.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
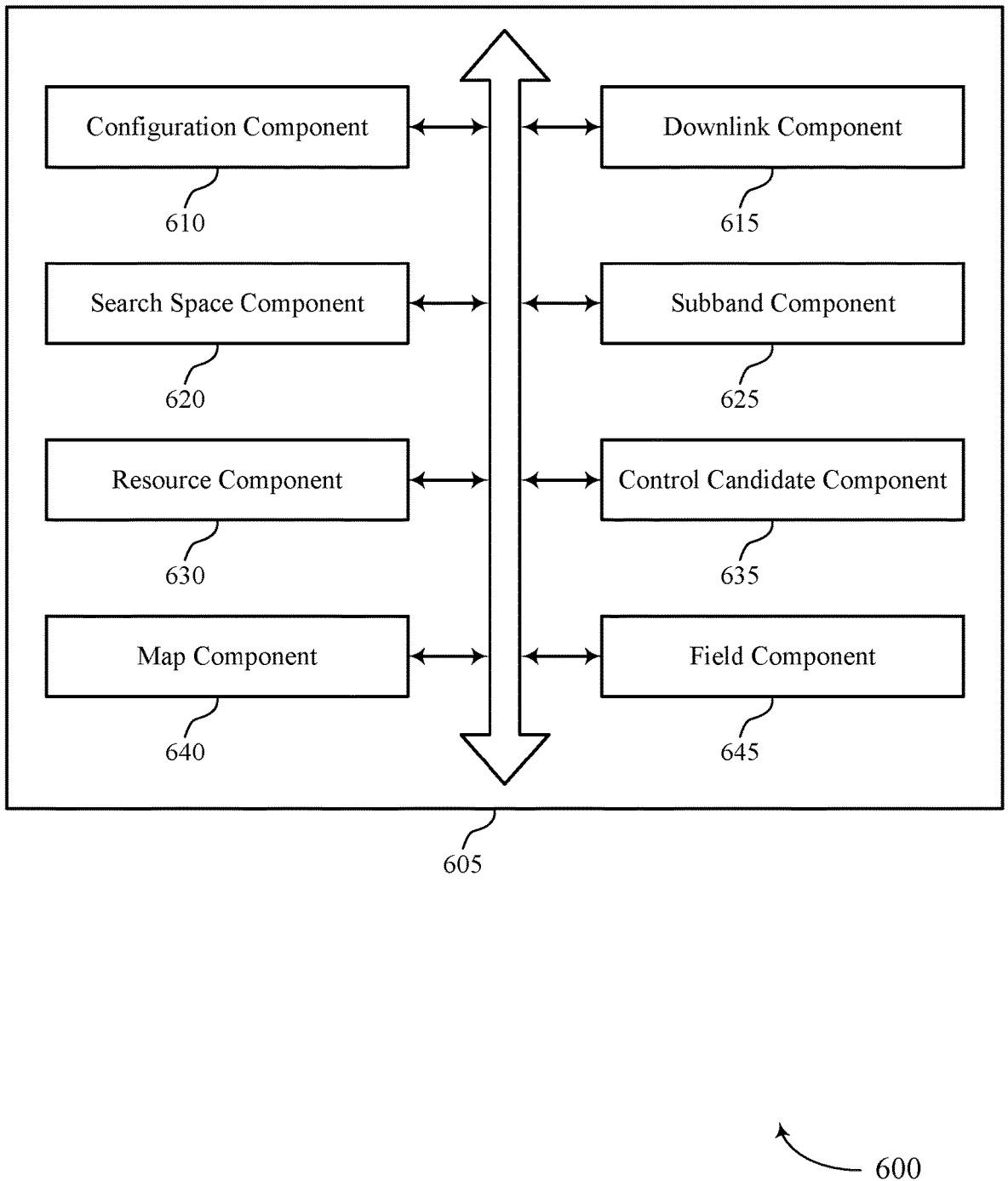
FIG. 6 shows a block diagram of a UE communications manager that supports dynamic search spaces in accordance with aspects of the present disclosure.

FIG. 6 shows a block diagram 600 of a UE communications manager 605 that supports dynamic search spaces in accordance with aspects of the present disclosure. The UE communications manager 605 may be an example of aspects of a UE communications manager 415, a UE communications manager 515, or a communications manager 710 described herein. The UE communications manager 605 may include a configuration component 610, a downlink component 615, a search space component 620, a subband component 625, a resource component 630, a control candidate component 635, a map component 640, and a field component 645. Each of these modules may communicate, directly or indirectly, with one another (e.g., via one or more buses).

The configuration component 610 may receive, on a downlink channel, a configuration defining a search space for a downlink control channel. In some examples, the configuration includes a semi-static configuration. The downlink component 615 may receive, on the downlink channel, a message including an indication of occupied control resources within the search space. In some examples, the downlink component 615 may receive, on the downlink control channel, a DCI block based on the monitoring. In some examples, the downlink component 615 may receive, on the downlink channel, an RRC configuration message defining an association between preempted resources of a downlink data channel and the occupied control resources within the search space. In some examples, the indication may be a preemption indication or a cancellation indication associated with a set of occupied data resources. The downlink component 615 may determine the occupied control resources based at least in part on the set of occupied data resources. In some examples, the downlink control channel includes a PDCCH.

The search space component 620 may monitor a modified version of the search space for the DCI block based on the configuration and the indication. In some examples, the search space component 620 may monitor the one or more unoccupied control resources in the modified version of the search space based on the adding. The search space component 620 may determine the modified version of the search space based at least in part on the configuration. The configuration indicates one or more selection parameters for the UE to determine one or more blind decoding candidates for the modified version of the search space. The subband component 625 may determine a frequency subband of the set of occupied data resources, where determining the occupied control resources is based on an association between the occupied control resources and the determined frequency subband. The resource component 630 may determine the modified version of the search space by dropping the occupied control resources from the search space.

The control candidate component 635 may add one or more blind decoding candidates to the modified version of the search space based on the dropping. The map component 640 may map the occupied control resources within the search space to one or more control resource sets within the search space, where dropping the occupied control resources from the search is based on the mapping. In some examples, the map component 640 may map the occupied control resources within the search space to one or more control resource sets within the search space based on a table, where dropping the occupied control resources from the search is based on the mapping. The field component 645 may identify a bit field in the message, where the bit field includes the indication of occupied control resources within the search space.

Figure 7:
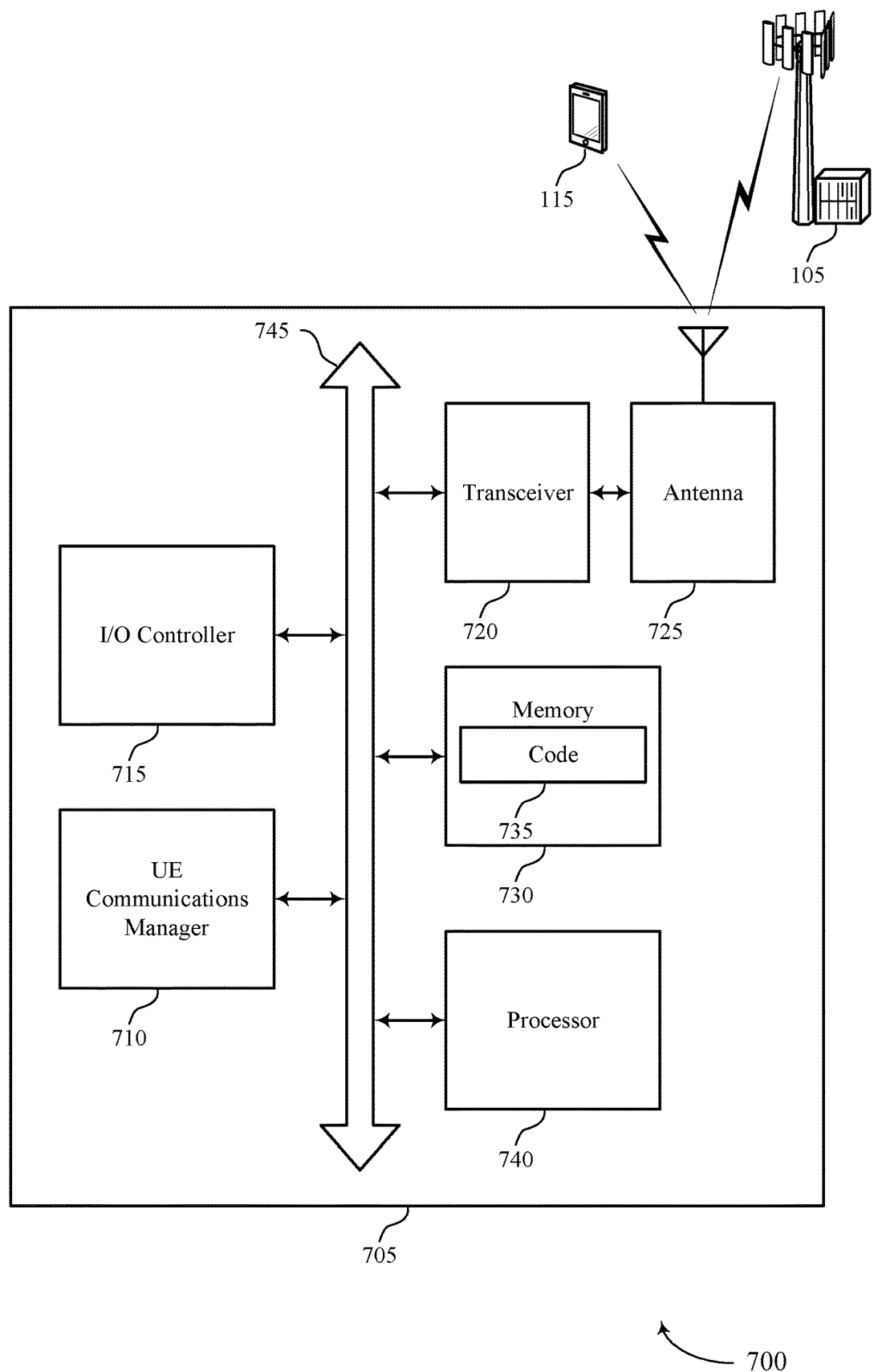
FIG. 7 shows a diagram of a system including a device that supports dynamic search spaces in accordance with aspects of the present disclosure.

FIG. 7 shows a diagram of a system 700 including a device 705 that supports dynamic search spaces in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive, on a downlink channel, a configuration defining a search space for a downlink control channel, receive, on the downlink channel, a message including an indication of occupied control resources within the search space. The communications manager 710 may monitor a modified version of the search space for a DCI block based on the indication, and receive, on the downlink control channel, the DCI block based on the monitoring. The device 705 may as described herein be implemented to realize one or more potential advantages. One implementation may allow the device 705 to save power and increase battery life. For example, the device 705 may reduce a number of blind decodes associated with a search space when control resources for a downlink control channel are occupied by data resources for a downlink data channel. The device 705 may experience reduced complexity, increased throughput through as a result of faster blind decoding. In other implementations, the device 705 may also improve user experience by promoting higher reliability and lower latency communications at the device 705 due to control channel scheduling flexibility of the device 705, as a result of supporting dynamic search spaces.

The I/O controller 715 may manage input and output signals for the device 705. The I/O controller 715 may also manage peripherals not integrated into the device 705. In some examples, the I/O controller 715 may represent a physical connection or port to an external peripheral. In some examples, the I/O controller 715 may utilize an operating system such as iOS, ANDROID, MS-DOS, MS-WINDOWS, OS/2, UNIX, LINUX, or another known operating system. In other cases, the I/O controller 715 may represent or interact with a modem, a keyboard, a mouse, a touchscreen, or a similar device. In some examples, the I/O controller 715 may be implemented as part of a processor. In some examples, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some examples, the device 705 may include a single antenna 725. However, in some examples, the device 705 may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some examples, the memory 730 may contain, among other things, a BIOS which may control basic hardware or software operation such as the interaction with peripheral components or devices.

The code 735 may include instructions to implement aspects of the present disclosure, including instructions to support wireless communications. The code 735 may be stored in a non-transitory computer-readable medium such as system memory or other type of memory. In some examples, the code 735 may not be directly executable by the processor 740 but may cause a computer (e.g., when compiled and executed) to perform functions described herein.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some examples, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting dynamic search spaces).

Figure 8:
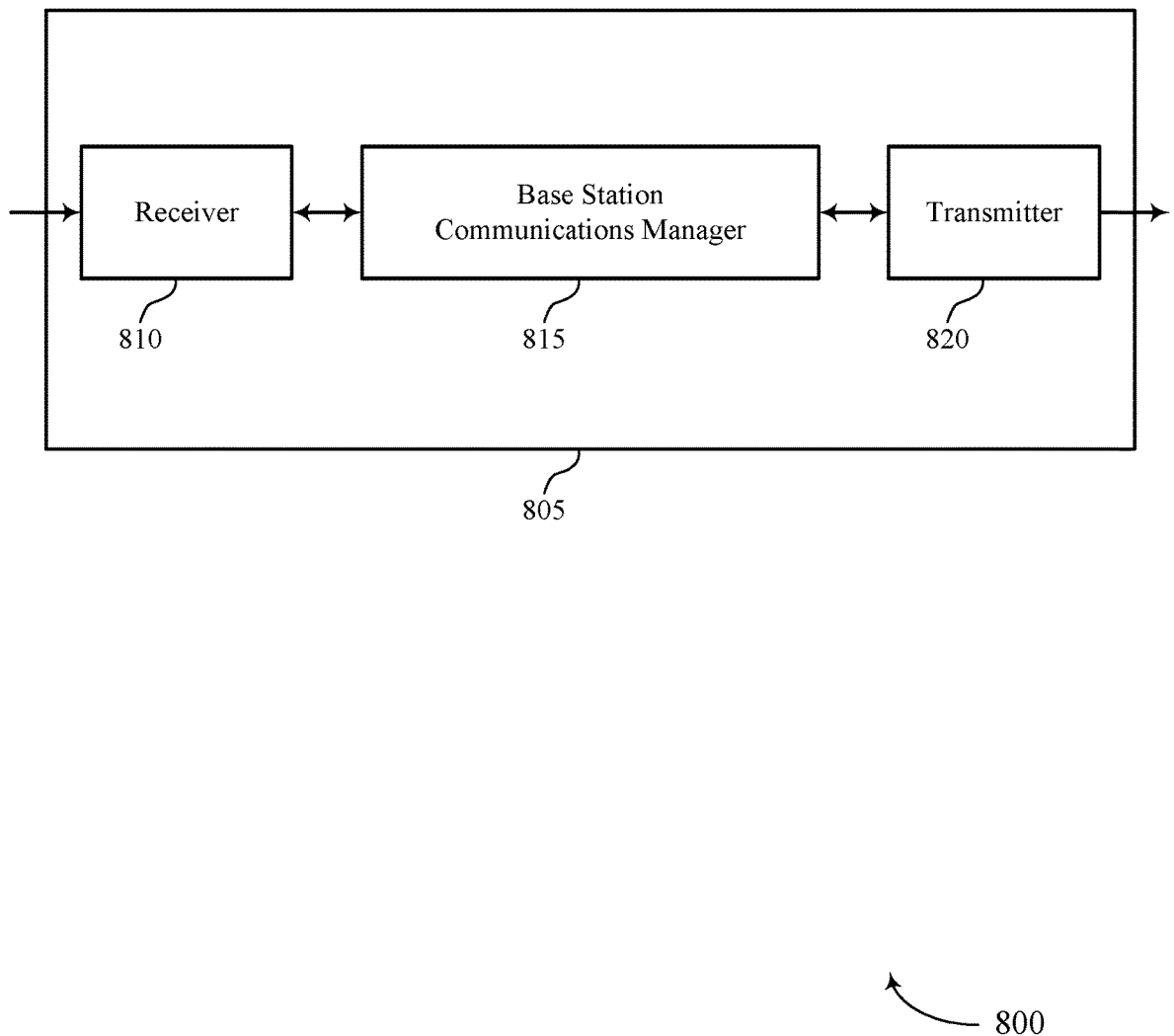
FIGS. 8 and 9 show block diagrams of devices that support dynamic search spaces in accordance with aspects of the present disclosure.

FIG. 8 shows a block diagram 800 of a device 805 that supports dynamic search spaces in accordance with aspects of the present disclosure. The device 805 may be an example of aspects of a base station 105 as described herein. The device 805 may include a receiver 810, a base station communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to dynamic search spaces, etc.). Information may be passed on to other components of the device 805. The receiver 810 may be an example of aspects of the transceiver 1120 described with reference to FIG. 11. The receiver 810 may utilize a single antenna or a set of antennas.

The base station communications manager 815 may transmit, on a downlink channel, a configuration defining a search space for a downlink control channel, transmit, on the downlink channel, a message including an indication of occupied control resources within the search space, transmit, on the downlink control channel, a DCI block based on the modified version of the search space, and modify a version of the search space for the DCI block based on the occupied control resources within the search space. The base station communications manager 815 may be an example of aspects of the base station communications manager 1110 described herein.

The base station communications manager 815, or its sub-components, may be implemented in hardware, code (e.g., software or firmware) executed by a processor, or any combination thereof. If implemented in code executed by a processor, the functions of the base station communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 815, or its sub-components, may be physically located at various positions, including being distributed such that portions of functions are implemented at different physical locations by one or more physical components. In some examples, the base station communications manager 815, or its sub-components, may be a separate and distinct component in accordance with various aspects of the present disclosure. In some examples, the base station communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
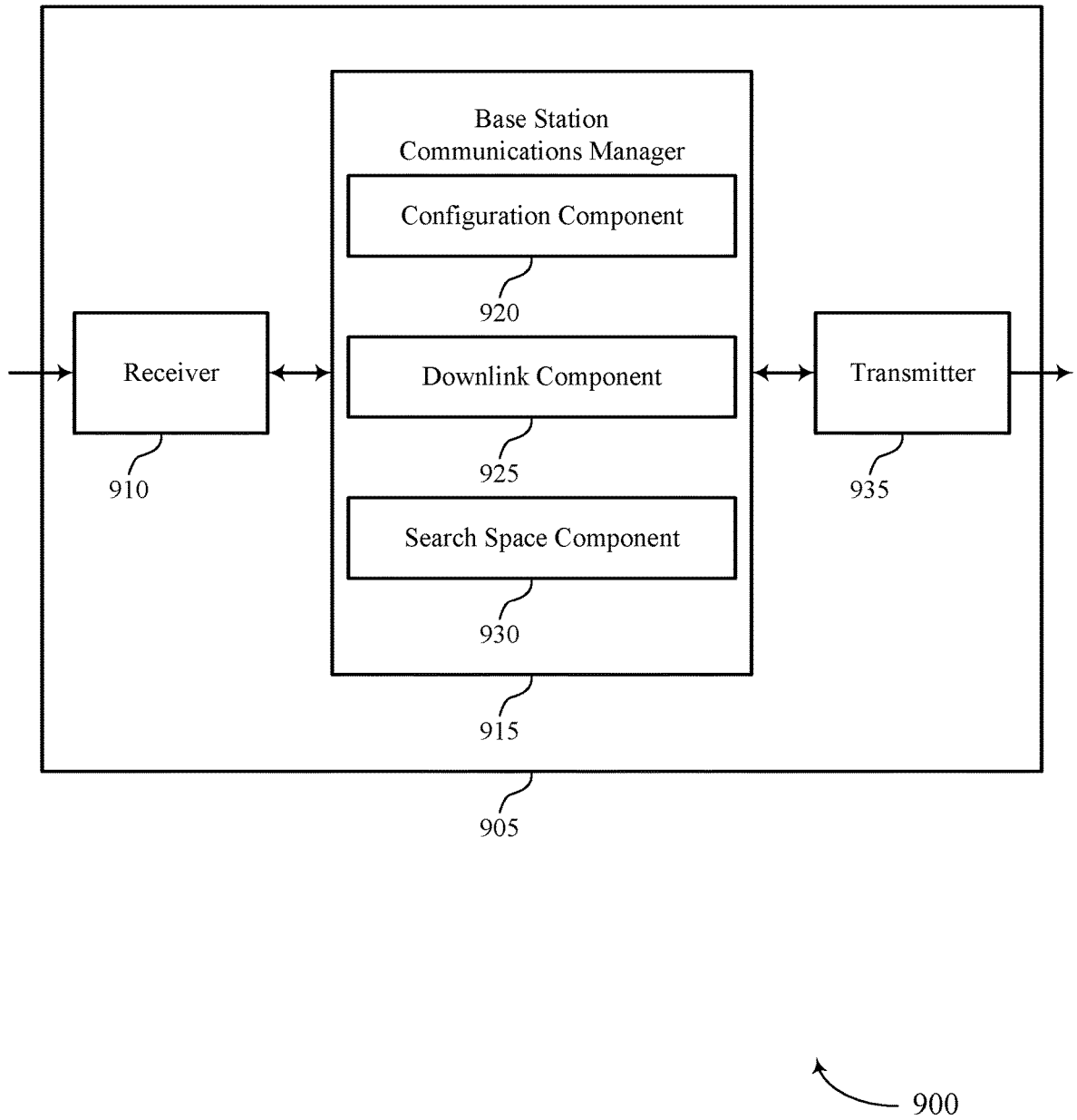

FIG. 9 shows a block diagram 900 of a device 905 that supports dynamic search spaces in accordance with aspects of the present disclosure. The device 905 may be an example of aspects of a device 805, or a base station 105 as described herein. The device 905 may include a receiver 910, a base station communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to dynamic search spaces, etc.). Information may be passed on to other components of the device 905. The receiver 910 may be an example of aspects of the transceiver 1120 described with reference to FIG. 11. The receiver 910 may utilize a single antenna or a set of antennas.

The base station communications manager 915 may be an example of aspects of the base station communications manager 915 as described herein. The base station communications manager 915 may include a configuration component 920, a downlink component 925, and a search space component 930. The base station communications manager 915 may be an example of aspects of the base station communications manager 1110 described herein.

The configuration component 920 may transmit, on a downlink channel, a configuration defining a search space for a downlink control channel. The downlink component 925 may transmit, on the downlink channel, a message including an indication of occupied control resources within the search space and transmit, on the downlink control channel, a DCI block based on the modified version of the search space. The search space component 930 may modify a version of the search space for the DCI block based on the occupied control resources within the search space.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
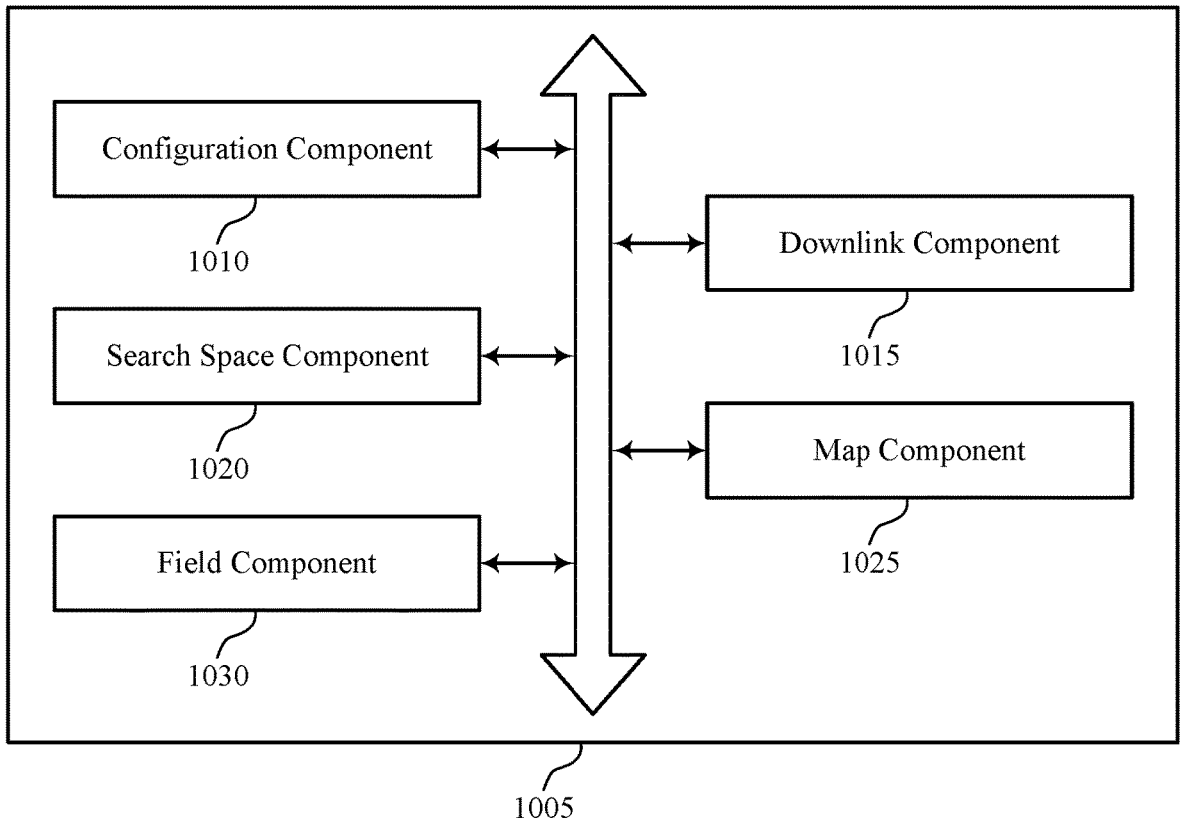
FIG. 10 shows a block diagram of a base station communications manager that supports dynamic search spaces in accordance with aspects of the present disclosure.

FIG. 10 shows a block diagram 1000 of a base station communications manager 1005 that supports dynamic search spaces in accordance with aspects of the present disclosure. The base station communications manager 1005 may be an example of aspects of a base station communications manager 815, a base station communications manager 915, or a base station communications manager 1110 described herein. The base station communications manager 1005 may include a configuration component 1010, a downlink component 1015, a search space component 1020, a map component 1025, and a field component 1030. Each of these modules may communicate, directly or indirectly, with one another (e.g., via one or more buses).

The configuration component 1010 may transmit, on a downlink channel, a configuration defining a search space for a downlink control channel. In some examples, the configuration component 1010 may transmit, on the downlink channel, an RRC configuration message defining an association between preempted resources of a downlink data channel and the occupied control resources within the search space. In some cases, the configuration includes a semi-static configuration.

The downlink component 1015 may transmit, on the downlink control channel, a message including an indication of occupied control resources within the search space. In some examples, the downlink component 1015 may transmit, on the downlink control channel, a DCI block based on the modified version of the search space. In some cases, the indication may be a preemption indication or a cancellation indication associated with a set of occupied data resources. In some cases, the downlink control channel includes a PDCCH.

The search space component 1020 may modify a version of the search space for the DCI block based on the occupied control resources within the search space. The search space component 1020 may modify the version of the search space based at least in part on the configuration. The configuration indicates one or more selection parameters for the UE to determine one or more blind decoding candidates for the modified version of the search space. The map component 1025 may map the occupied control resources within the search space to one or more control resource sets within the search space based on a table. In some examples, the map component 1025 may map the occupied control resources within the search space to one or more control resource sets within the search space. The field component 1030 may include the indication in a bit filed in the DCI block, where the bit field includes the indication of occupied control resources within the search space.

Figure 11:
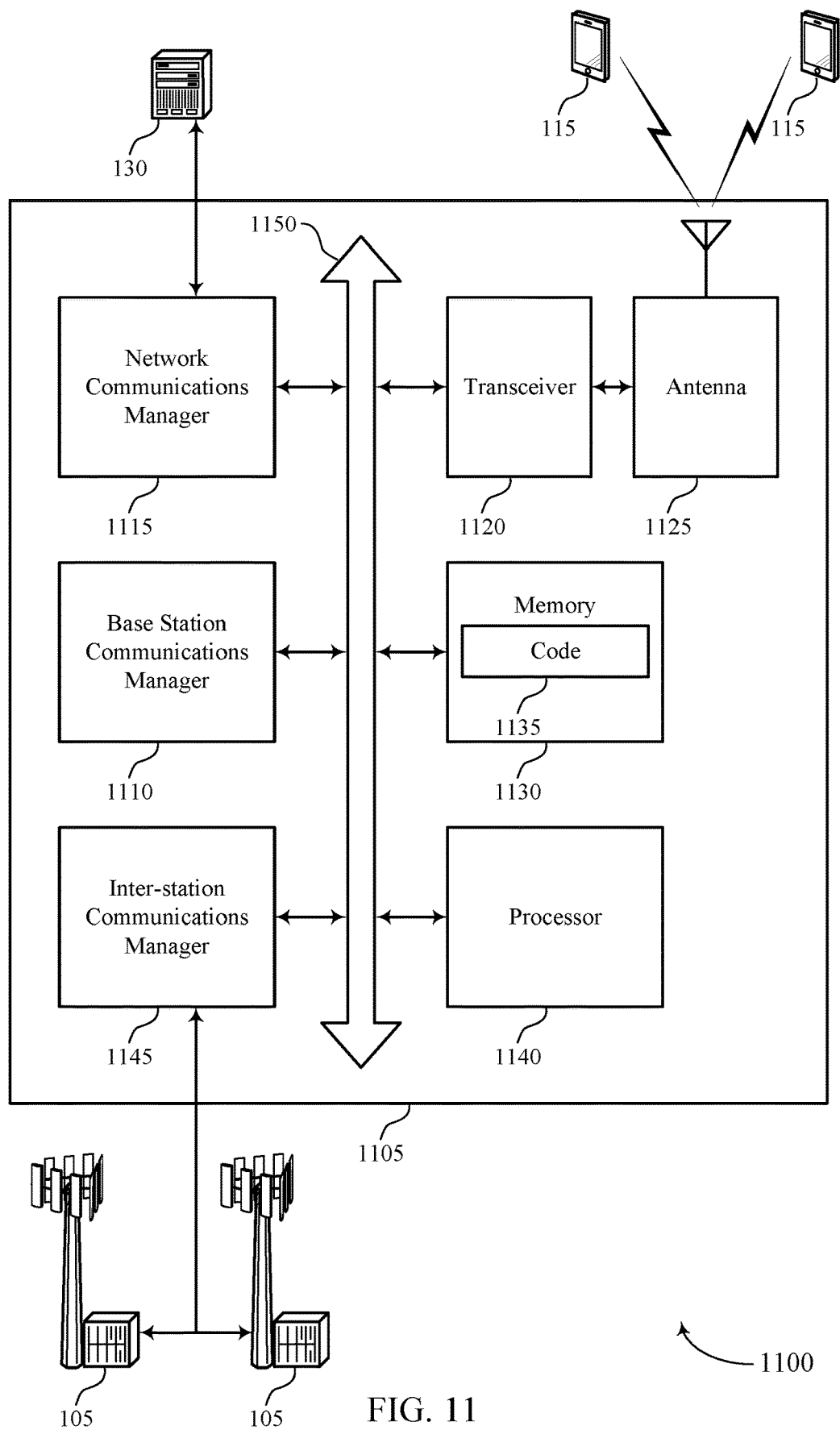
FIG. 11 shows a diagram of a system including a device that supports dynamic search spaces in accordance with aspects of the present disclosure

FIG. 11 shows a diagram of a system 1100 including a device 1105 that supports dynamic search spaces in accordance with aspects of the present disclosure. The device 1105 may be an example of or include the components of device 805, device 905, or a base station 105 as described herein. The device 1105 may include components for bi-directional voice and data communications including components for transmitting and receiving communications, including a base station communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The base station communications manager 1110 may transmit, on a downlink channel, a configuration defining a search space for a downlink control channel, and transmit, on the downlink channel, a message including an indication of occupied control resources within the search space. The base station communications manager 1110 may modify a version of the search space for a DCI block based on the occupied control resources within the search space, and transmit, on the downlink control channel, a DCI block based on the modified version of the search space.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the device 1105 may include a single antenna 1125. However, in some cases, the device 1105 may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting dynamic search spaces).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
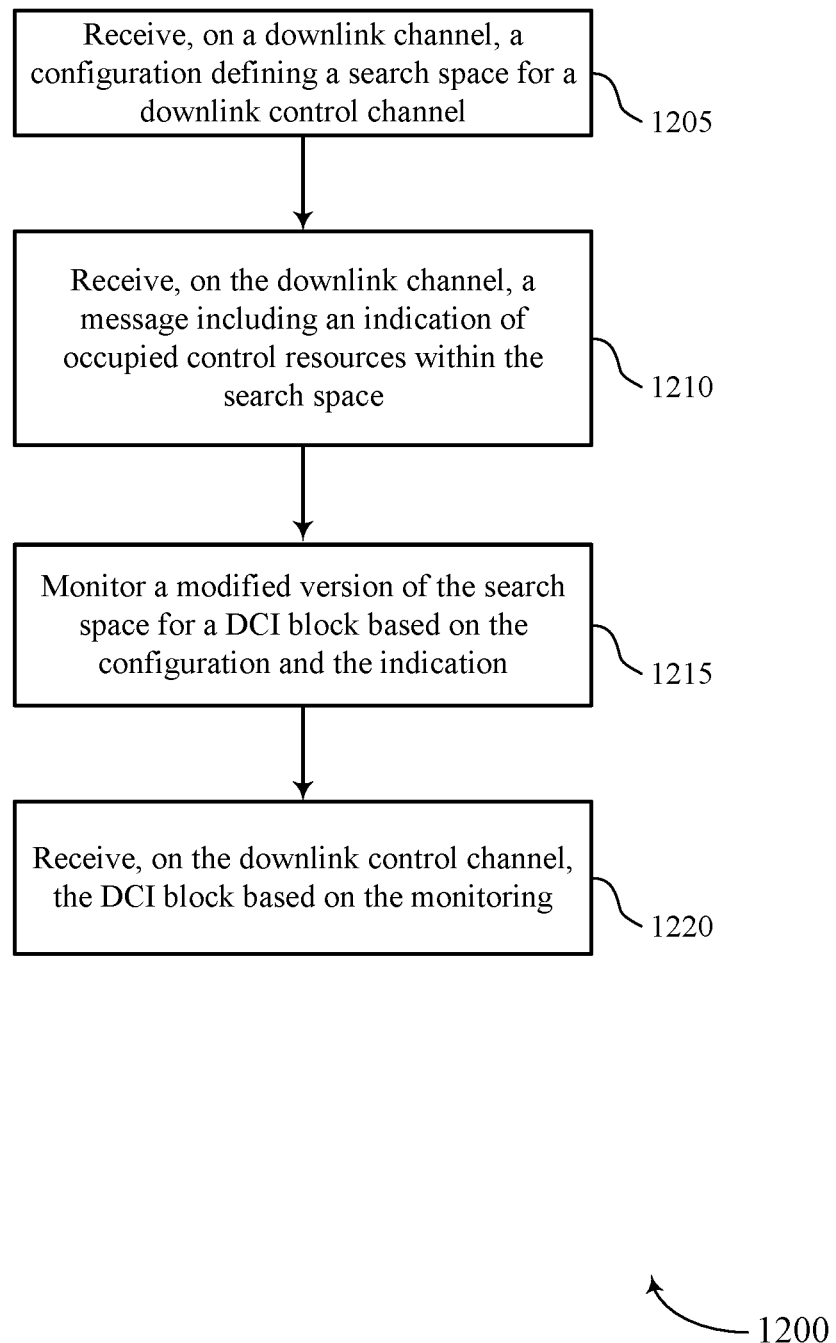
FIGS. 12 through 16 show flowcharts illustrating methods that support dynamic search spaces in accordance with aspects of the present disclosure.

FIG. 12 shows a flowchart illustrating a method 1200 that supports dynamic search spaces in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may receive, on a downlink channel, a configuration defining a search space for a downlink control channel. The operations of 1205 may be performed according to the methods described herein. In some examples, aspects of the operations of 1205 may be performed by a configuration component as described with reference to FIGS. 4 through 7.

At 1210, the UE may receive, on the downlink channel, a message including an indication of occupied control resources within the search space. The operations of 1210 may be performed according to the methods described herein. In some examples, aspects of the operations of 1210 may be performed by a downlink component as described with reference to FIGS. 4 through 7.

At 1215, the UE may monitor a modified version of the search space for a DCI block based on the indication. The operations of 1215 may be performed according to the methods described herein. In some examples, aspects of the operations of 1215 may be performed by a search space component as described with reference to FIGS. 4 through 7.

At 1220, the UE may receive, on the downlink control channel, the DCI block based on the monitoring. The operations of 1220 may be performed according to the methods described herein. In some examples, aspects of the operations of 1220 may be performed by a downlink component as described with reference to FIGS. 4 through 7.

Figure 13:
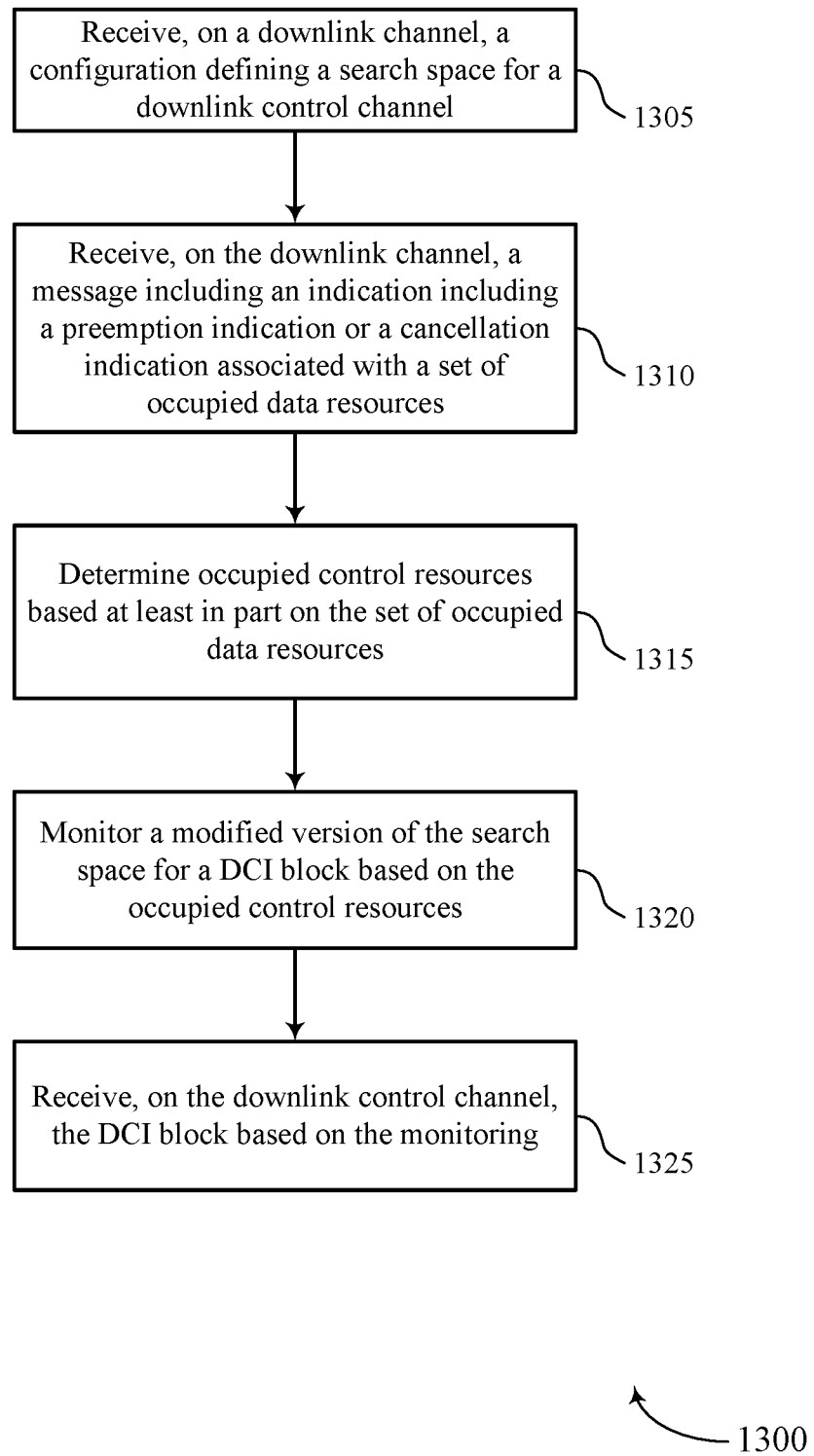

FIG. 13 shows a flowchart illustrating a method 1300 that supports dynamic search spaces in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may receive, on a downlink channel, a configuration defining a search space for a downlink control channel. The operations of 1305 may be performed according to the methods described herein. In some examples, aspects of the operations of 1305 may be performed by a configuration component as described with reference to FIGS. 4 through 7.

At 1310, the UE may receive, on the downlink control channel, a message including a preemption indication or a cancellation indication associated with a set of occupied data resources. The operations of 1310 may be performed according to the methods described herein. In some examples, aspects of the operations of 1310 may be performed by a downlink component as described with reference to FIGS. 4 through 7.

At 1315, the UE may determine occupied control resources based at least in part on the set of occupied data resources. The operations of 1315 may be performed according to the methods described herein. In some examples, aspects of the operations of 1315 may be performed by a downlink component as described with reference to FIGS. 4 through 7.

At 1320, the UE may monitor a modified version of the search space for a DCI block based on the occupied control resources. The operations of 1320 may be performed according to the methods described herein. In some examples, aspects of the operations of 1320 may be performed by a search space component as described with reference to FIGS. 4 through 7.

At 1325, the UE may receive, on the downlink control channel, the DCI block based on the monitoring. The operations of 1325 may be performed according to the methods described herein. In some examples, aspects of the operations of 1325 may be performed by a downlink component as described with reference to FIGS. 4 through 7.

Figure 14:
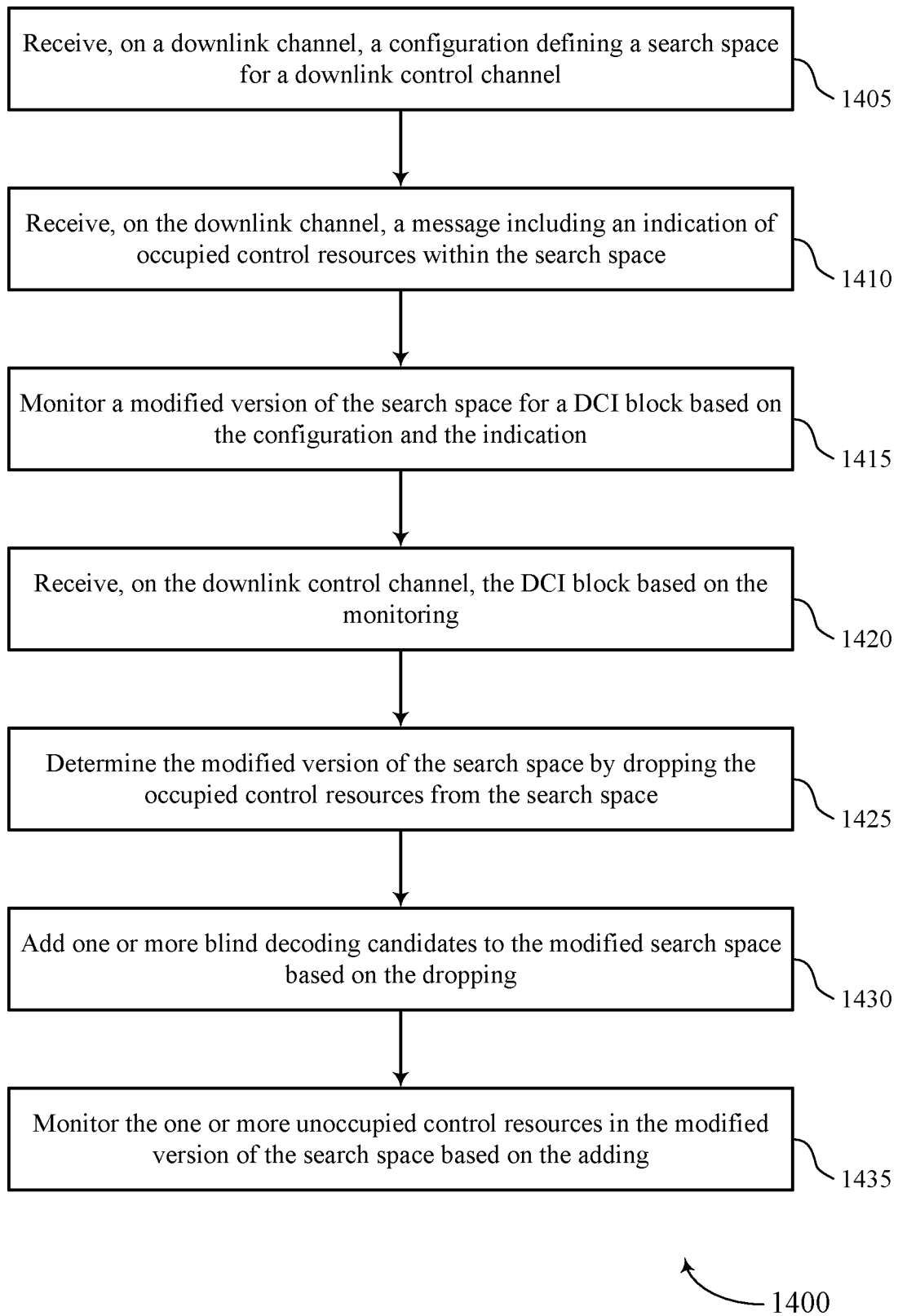

FIG. 14 shows a flowchart illustrating a method 1400 that supports dynamic search spaces in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may receive, on a downlink channel, a configuration defining a search space for a downlink control channel. The operations of 1405 may be performed according to the methods described herein. In some examples, aspects of the operations of 1405 may be performed by a configuration component as described with reference to FIGS. 4 through 7.

At 1410, the UE may receive, on the downlink channel, a message including an indication of occupied control resources within the search space. The operations of 1410 may be performed according to the methods described herein. In some examples, aspects of the operations of 1410 may be performed by a downlink component as described with reference to FIGS. 4 through 7.

At 1415, the UE may monitor a modified version of the search space for a DCI block based on the configuration and the indication. The operations of 1415 may be performed according to the methods described herein. In some examples, aspects of the operations of 1415 may be performed by a search space component as described with reference to FIGS. 4 through 7.

At 1420, the UE may receive, on the downlink control channel, the DCI block based on the monitoring. The operations of 1420 may be performed according to the methods described herein. In some examples, aspects of the operations of 1420 may be performed by a downlink component as described with reference to FIGS. 4 through 7.

At 1425, the UE may determine the modified version of the search space by dropping the occupied control resources from the search space. The operations of 1425 may be performed according to the methods described herein. In some examples, aspects of the operations of 1425 may be performed by a resource component as described with reference to FIGS. 4 through 7.

At 1430, the UE may add one or more blind decoding candidates to the modified version of the search space based on the dropping. The operations of 1430 may be performed according to the methods described herein. In some examples, aspects of the operations of 1430 may be performed by a control candidate component as described with reference to FIGS. 4 through 7.

At 1435, the UE may monitor the one or more unoccupied control resources in the modified version of the search space based on the adding. The operations of 1435 may be performed according to the methods described herein. In some examples, aspects of the operations of 1435 may be performed by a search space component as described with reference to FIGS. 4 through 7.

Figure 15:
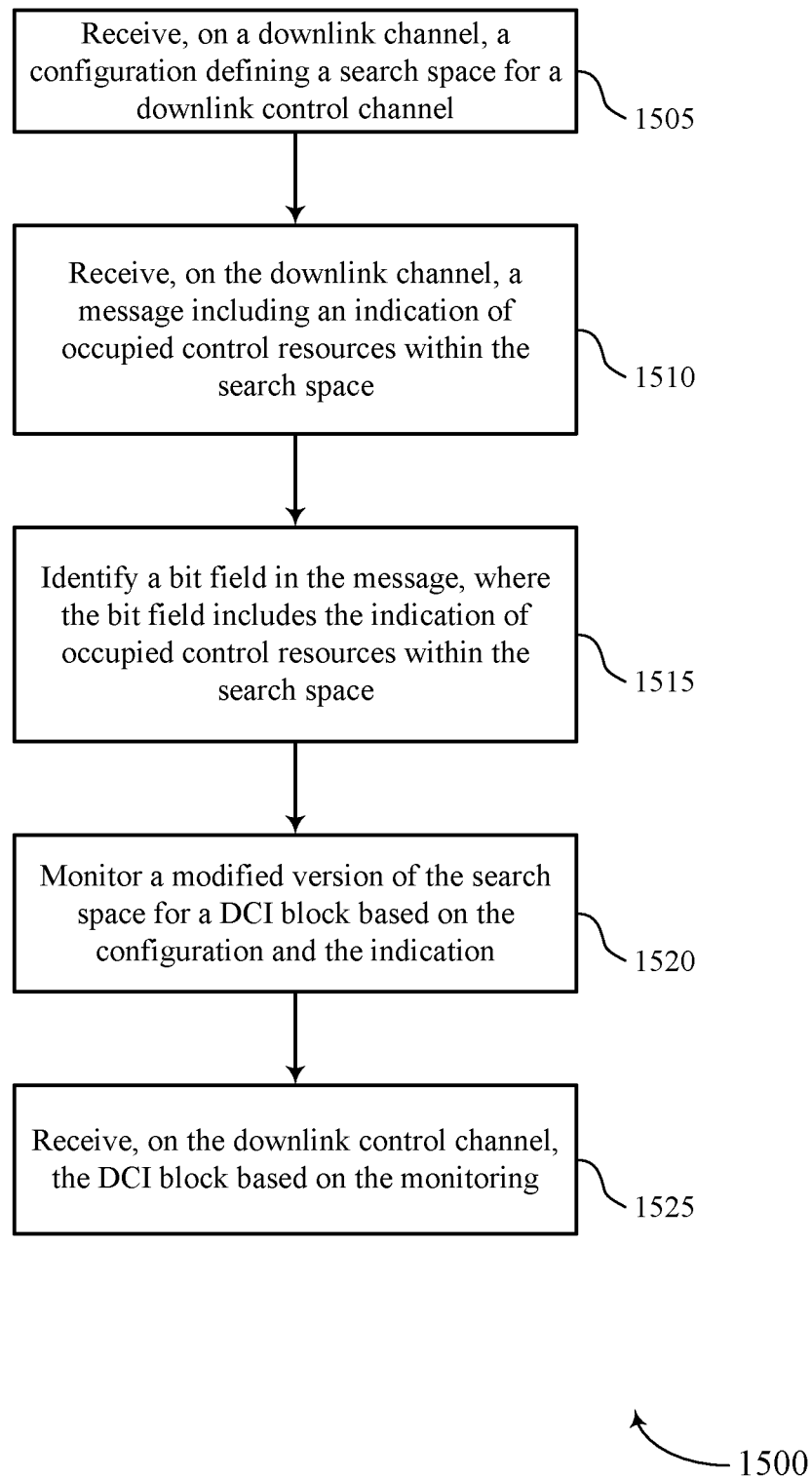

FIG. 15 shows a flowchart illustrating a method 1500 that supports dynamic search spaces in accordance with aspects of the present disclosure. The operations of method 1500 may be implemented by a UE 115 or its components as described herein. For example, the operations of method 1500 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1505, the UE may receive, on a downlink channel, a configuration defining a search space for a downlink control channel. The operations of 1505 may be performed according to the methods described herein. In some examples, aspects of the operations of 1505 may be performed by a configuration component as described with reference to FIGS. 4 through 7.

At 1510, the UE may receive, on the downlink channel, a message including an indication of occupied control resources within the search space. The operations of 1510 may be performed according to the methods described herein. In some examples, aspects of the operations of 1510 may be performed by a downlink component as described with reference to FIGS. 4 through 7.

At 1515, the UE may identify a bit field in the message, where the bit field includes the indication of occupied control resources within the search space. The operations of 1515 may be performed according to the methods described herein. In some examples, aspects of the operations of 1515 may be performed by a field component as described with reference to FIGS. 4 through 7.

At 1520, the UE may monitor a modified version of the search space for a DCI block based on the configuration and the indication. The operations of 1520 may be performed according to the methods described herein. In some examples, aspects of the operations of 1520 may be performed by a search space component as described with reference to FIGS. 4 through 7.

At 1525, the UE may receive, on the downlink control channel, the DCI block based on the monitoring. The operations of 1525 may be performed according to the methods described herein. In some examples, aspects of the operations of 1525 may be performed by a downlink component as described with reference to FIGS. 4 through 7.

Figure 16:
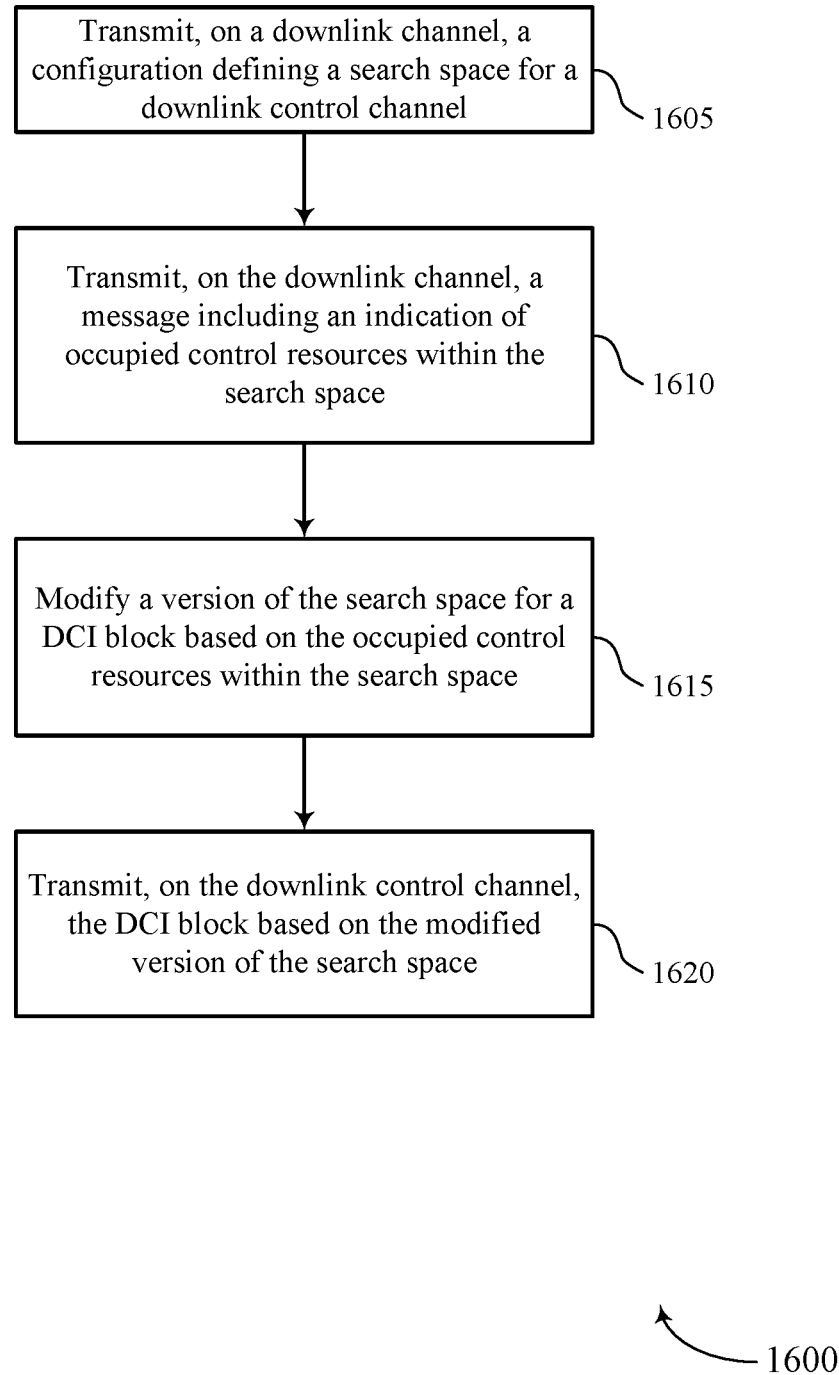

FIG. 16 shows a flowchart illustrating a method 1600 that supports dynamic search spaces in accordance with aspects of the present disclosure. The operations of method 1600 may be implemented by a base station 105 or its components as described herein. For example, the operations of method 1600 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1605, the base station may transmit, on a downlink channel, a configuration defining a search space for a downlink control channel. The operations of 1605 may be performed according to the methods described herein. In some examples, aspects of the operations of 1605 may be performed by a configuration component as described with reference to FIGS. 8 through 11.

At 1610, the base station may transmit, on the downlink channel, a message including an indication of occupied control resources within the search space. The operations of 1610 may be performed according to the methods described herein. In some examples, aspects of the operations of 1610 may be performed by a downlink component as described with reference to FIGS. 8 through 11.

At 1615, the base station may modify a version of the search space for a DCI block based on the occupied control resources within the search space. The operations of 1615 may be performed according to the methods described herein. In some examples, aspects of the operations of 1615 may be performed by a search space component as described with reference to FIGS. 8 through 11.

At 1620, the base station may transmit, on the downlink control channel, the DCI block based on the modified version of the search space. The operations of 1620 may be performed according to the methods described herein. In some examples, aspects of the operations of 1620 may be performed by a downlink component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving, on a downlink channel, a configuration defining a search space for a downlink control channel; receiving, on the downlink channel, a message comprising an indication of occupied control resources within the search space; monitoring a modified version of the search space for a DCI block based at least in part on the configuration and the indication; and receiving, on the downlink control channel, the DCI block based at least in part on the monitoring.

Aspect 2: The method of aspect 1, wherein the indication comprises one or more of: a preemption indication or a cancellation indication associated with a set of occupied data resources, the method further comprising: determining the occupied control resources based at least in part on the set of occupied data resources.

Aspect 3: The method of aspect 2, further comprising: determining a frequency subband of the set of occupied data resources, wherein determining the occupied control resources is based at least in part on an association between the occupied control resources and the determined frequency subband.

Aspect 4: The method of any of aspects 1 through 3, further comprising: determining the modified version of the search space based at least in part on the configuration.

Aspect 5: The method of aspect 4, wherein the configuration indicates one or more selection parameters for the UE to determine one or more blind decoding candidates for the modified version of the search space.

Aspect 6: The method of any of aspects 1 through 5, further comprising: determining the modified version of the search space by dropping the occupied control resources from the search space.

Aspect 7: The method of aspect 6, further comprising: adding one or more blind decoding candidates to the modified version of the search space based at least in part on the dropping.

Aspect 8: The method of aspect 7, further comprising: monitoring one or more unoccupied control resources in the modified version of the search space based at least in part on the adding.

Aspect 9: The method of any of aspects 6 through 8, wherein determining the modified version of the search space comprises: mapping the occupied control resources within the search space to one or more control resource sets within the search space, wherein dropping the occupied control resources from the search is based at least in part on the mapping.

Aspect 10: The method of any of aspects 6 through 9, wherein determining the modified version of the search space comprises: mapping the occupied control resources within the search space to one or more control resource sets within the search space based at least in part on a table, wherein dropping the occupied control resources from the search is based at least in part on the mapping.

Aspect 11: The method of any of aspects 1 through 10, further comprising: identifying a bit field in the message, wherein the bit field comprises the indication of occupied control resources within the search space.

Aspect 12: The method of any of aspects 1 through 11, further comprising: receiving, on the downlink channel, an RRC configuration message defining an association between preempted resources of a downlink data channel and the occupied control resources within the search space.

Aspect 13: The method of any of aspects 1 through 12, wherein the downlink control channel comprises a PDCCH.

Aspect 14: The method of any of aspects 1 through 13, wherein the configuration comprises a semi-static configuration.

Aspect 15: A method for wireless communication at a base station, comprising: transmitting, on a downlink channel, a configuration defining a search space for a downlink control channel; transmitting, on the downlink channel, a message comprising an indication of occupied control resources within the search space; modifying a version of the search space for a DCI block based at least in part on the occupied control resources within the search space; and transmitting, on the downlink control channel, the DCI block based at least in part on the modified version of the search space.

Aspect 16: The method of aspect 15, wherein the indication comprises one or more of a preemption indication or a cancellation indication associated with a set of occupied data resources.

Aspect 17: The method of any of aspects 15 through 16, wherein modifying the version of the search space comprises: mapping the occupied control resources within the search space to one or more control resource sets within the search space based at least in part on a table.

Aspect 18: The method of any of aspects 15 through 17, wherein modifying the version of the search space comprises: mapping the occupied control resources within the search space to one or more control resource sets within the search space.

Aspect 19: The method of any of aspects 15 through 18, further comprising: modifying the version of the search space based at least in part on the configuration.

Aspect 20: The method of aspect 19, wherein the configuration indicates one or more selection parameters for modifying the version of the search space.

Aspect 21: The method of any of aspects 15 through 20, further comprising: including the indication in a bit field in the DCI block, wherein the bit field comprises the indication of occupied control resources within the search space.

Aspect 22: The method of any of aspects 15 through 21, further comprising: transmitting, on the downlink channel, an RRC configuration message defining an association between preempted resources of a downlink data channel and the occupied control resources within the search space.

Aspect 23: The method of any of aspects 15 through 22, wherein the downlink control channel comprises a PDCCH.

Aspect 24: The method of any of aspects 15 through 23, wherein the configuration comprises a semi-static configuration.

Aspect 25: An apparatus for wireless communication at a UE, comprising a processor; memory coupled with the processor; and instructions stored in the memory and executable by the processor to cause the apparatus to perform a method of any of aspects 1 through 14.

Aspect 26: An apparatus for wireless communication at a UE, comprising at least one means for performing a method of any of aspects 1 through 14.

Aspect 27: A non-transitory computer-readable medium storing code for wireless communication at a UE, the code comprising instructions executable by a processor to perform a method of any of aspects 1 through 14.

Aspect 28: An apparatus for wireless communication at a base station, comprising a processor; memory coupled with the processor; and instructions stored in the memory and executable by the processor to cause the apparatus to perform a method of any of aspects 15 through 24.

Aspect 29: An apparatus for wireless communication at a base station, comprising at least one means for performing a method of any of aspects 15 through 24.

Aspect 30: A non-transitory computer-readable medium storing code for wireless communication at a base station, the code comprising instructions executable by a processor to perform a method of any of aspects 15 through 24.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A user equipment (UE) for wireless communication, comprising:
    a memory; and
    at least one processor coupled to the memory, wherein the at least one processor is configured to:
        receive, on a downlink channel, a configuration defining a search space for a downlink control channel;
        receive, on the downlink channel, a message comprising an indication of occupied control resources within the search space, wherein the indication comprises one or more of: a preemption indication or a cancellation indication associated with a set of occupied data resources;
        monitor a modified version of the search space for a downlink control information block based on the configuration and the indication; and
        receive, on the downlink control channel, the downlink control information block based on the monitoring.

2. The UE of claim 1, wherein the at least one processor is configured to:
   determine the occupied control resources based on the set of occupied data resources.

3. The UE of claim 2, wherein the at least one processor further configured to:
   determine a frequency subband of the set of occupied data resources, wherein determining the occupied control resources is based on an association between the occupied control resources and the determined frequency subband.

4. The UE of claim 1, wherein the at least one processor further configured to:
   determine the modified version of the search space based on the configuration.

5. The UE of claim 4, wherein the configuration indicates one or more selection parameters for the UE to determine one or more blind decoding candidates for the modified version of the search space.

6. The UE of claim 1, wherein the at least one processor further configured to:
   determine the modified version of the search space by dropping the occupied control resources from the search space.

7. The UE of claim 6, wherein the at least one processor further configured to:
   add one or more blind decoding candidates to the modified version of the search space based on the dropping.

8. The UE of claim 7, wherein the at least one processor further configured to:
   monitor one or more unoccupied control resources in the modified version of the search space based on the one or more blind decoding candidates.

9. The UE of claim 6, wherein, to determine the modified version of the search space, the at least one processor is configured to:
   map the occupied control resources within the search space to one or more control resource sets within the search space, wherein dropping the occupied control resources from the search space is based on the mapping.

10. The UE of claim 6, wherein, to determine the modified version of the search space, the at least one processor is configured to:
    map the occupied control resources within the search space to one or more control resource sets within the search space based on a table, wherein dropping the occupied control resources from the search space is based on the mapping.

11. The UE of claim 1, wherein the at least one processor further configured to:
    identify a bit field in the message, wherein the bit field comprises the indication of occupied control resources within the search space.

12. The UE of claim 1, wherein the at least one processor further configured to:
    receive, on the downlink channel, a radio resource control configuration message defining an association between preempted resources of a downlink data channel and the occupied control resources within the search space.

13. The UE of claim 1, wherein the downlink control channel comprises a physical downlink control channel.

14. The UE of claim 1, wherein the configuration comprises a semi-static configuration.

15. A network node for wireless communication, comprising:
    a memory; and
    at least one processor coupled to the memory, wherein the at least one processor is configured to:
      transmit, on a downlink channel, a configuration defining a search space for a downlink control channel;
      transmit, on the downlink channel, a message comprising an indication of occupied control resources within the search space, wherein the indication comprises one or more of: a preemption indication or a cancellation indication associated with a set of occupied data resources;
      modify a version of the search space for a downlink control information block based on the occupied control resources within the search space; and
      transmit, on the downlink control channel, the downlink control information block based on the modified version of the search space.

16. The network node of claim 15, wherein, to modify the version of the search space, the at least one processor is configured to:
    map the occupied control resources within the search space to one or more control resource sets within the search space based on a table.

17. The network node of claim 15, wherein, to modify the version of the search space, the at least one processor is configured to:
    map the occupied control resources within the search space to one or more control resource sets within the search space.

18. The network node of claim 15, wherein the at least one processor further configured to:
    modify the version of the search space based on the configuration.

19. The network node of claim 18, wherein the configuration indicates one or more selection parameters for modifying the version of the search space.

20. The network node of claim 15, wherein the at least one processor further configured to:
    include the indication in a bit field in the downlink control information block, wherein the bit field comprises the indication of occupied control resources within the search space.

21. The network node of claim 15, wherein the at least one processor further configured to:
    transmit, on the downlink channel, a radio resource control configuration message defining an association between preempted resources of a downlink data channel and the occupied control resources within the search space.

22. The network node of claim 15, wherein the downlink control channel comprises a physical downlink control channel.

23. The network node of claim 15, wherein the configuration comprises a semi-static configuration.

24. A method for wireless communication at a user equipment (UE), comprising:
    receiving, on a downlink channel, a configuration defining a search space for a downlink control channel;
    receiving, on the downlink channel, a message comprising an indication of occupied control resources within the search space, wherein the indication comprises one or more of: a preemption indication or a cancellation indication associated with a set of occupied data resources;

monitoring a modified version of the search space for a downlink control information block based on the configuration and the indication; and receiving, on the downlink control channel, the downlink control information block based on the monitoring.

25. The method of claim 24, further comprising:
determining the occupied control resources based on the set of occupied data resources.

26. The method of claim 25, further comprising:
determining a frequency subband of the set of occupied data resources, wherein determining the occupied control resources is based on an association between the occupied control resources and the determined frequency subband.

27. A method for wireless communication at a first network node, comprising:
transmitting, on a downlink channel, a configuration defining a search space for a downlink control channel;

transmitting, on the downlink channel, a message comprising an indication of occupied control resources within the search space, wherein the indication comprises one or more of: a preemption indication or a cancellation indication associated with a set of occupied data resources;

modifying a version of the search space for a downlink control information block based on the occupied control resources within the search space; and transmitting, on the downlink control channel, the downlink control information block based on the modified version of the search space.

28. The method of claim 27, wherein modifying the version of the search space comprises:
mapping the occupied control resources within the search space to one or more control resource sets within the search space based on a table.

* * * * *